(12) United States Patent
Minami

(10) Patent No.: US 10,941,916 B2
(45) Date of Patent: Mar. 9, 2021

(54) LIGHT SOURCE UNIT AND ILLUMINATING DEVICE

(71) Applicant: Panasonic Intellectual Property Management Co., Ltd., Osaka (JP)

(72) Inventor: Kazuhiro Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/546,332

(22) Filed: Aug. 21, 2019

(65) Prior Publication Data
US 2019/0376657 A1 Dec. 12, 2019

Related U.S. Application Data

(63) Continuation of application No. PCT/JP2017/030026, filed on Aug. 23, 2017.

(30) Foreign Application Priority Data

Mar. 29, 2017 (JP) .............................. JP2017-065947

(51) Int. Cl.
*F21S 41/176* (2018.01)
*F21S 41/675* (2018.01)
*F21S 41/20* (2018.01)

(52) U.S. Cl.
CPC .......... *F21S 41/176* (2018.01); *F21S 41/285* (2018.01); *F21S 41/675* (2018.01)

(58) Field of Classification Search
CPC ........ F21S 41/176; F21S 41/18; F21S 41/285; F21S 41/675; G03F 21/00; G03F 21/14; G03B 21/00; G03B 21/14; H04N 5/74
See application file for complete search history.

(56) References Cited

U.S. PATENT DOCUMENTS

2012/0249972 A1 10/2012 Kurosaki
2013/0250253 A1* 9/2013 Ogura .................. G03B 21/204
353/85
(Continued)

FOREIGN PATENT DOCUMENTS

JP 2001-349993 12/2001
JP 405459413 2/2008
(Continued)

OTHER PUBLICATIONS

International Search Report of PCT application No. PCT/JP2017/030026 dated Oct. 17, 2017.

*Primary Examiner* — Zheng Song
(74) *Attorney, Agent, or Firm* — McDermott Will and Emery LLP

(57) ABSTRACT

A light source unit according to an aspect of the present disclosure includes: a phosphor; a condenser lens; a first light source part; and a second light source part. The phosphor emits fluorescent light based on first excitation light and second excitation light. The condenser lens condenses the first excitation light and the second excitation light on the phosphor. The first light source part emits the first excitation light such that the first excitation light forms a first light intensity distribution on the phosphor. The second light source part emits the second excitation light such that the second excitation light forms a second light intensity distribution different from the first light intensity distribution, on the phosphor.

16 Claims, 18 Drawing Sheets

(56) References Cited

U.S. PATENT DOCUMENTS

| | | | |
|---|---|---|---|
| 2014/0285774 A1* | 9/2014 | Tajiri | G03B 21/208 353/38 |
| 2014/0362600 A1 | 12/2014 | Suckling et al. | |
| 2015/0323144 A1* | 11/2015 | Naka | F21V 9/08 362/19 |
| 2015/0323156 A1* | 11/2015 | Miyoshi | G01N 21/645 362/84 |
| 2015/0369437 A1* | 12/2015 | Reinprecht | F21S 41/143 362/510 |
| 2016/0062221 A1 | 3/2016 | Matsubara | |
| 2016/0334695 A1 | 11/2016 | Yamada et al. | |
| 2017/0122515 A1* | 5/2017 | Bhakta | F21S 41/125 |
| 2018/0106455 A1* | 4/2018 | Uchida | F21S 41/125 |

FOREIGN PATENT DOCUMENTS

| | | |
|---|---|---|
| JP | 2012-119193 | 6/2012 |
| JP | 2012-215633 | 11/2012 |
| JP | 2013-195822 | 9/2013 |
| JP | 2015-501062 | 1/2015 |
| JP | 2016-095486 | 5/2016 |
| WO | 2013/094222 | 6/2013 |
| WO | 2014/196015 | 12/2014 |
| WO | 2015/129656 | 9/2015 |

\* cited by examiner

LIGHT SOURCE UNIT AND ILLUMINATING DEVICE

TECHNICAL FIELD

The present disclosure relates to a light source unit and an illuminating device that use fluorescence emission by a phosphor.

BACKGROUND ART

PTL 1 discloses a light source device to effectively use light emitted from a phosphor, in a projector. The light source device of PTL 1 includes: a first light source that emits blue excitation light; a second light source that emits red light; a phosphor unit having a phosphor; a combiner having a visible light reflection film and a transmissive window for visible light; and an optical system that guides light to a micromirror. The first light source converts blue excitation light into collimated light by a collimator lens and then emits the blue excitation light to the phosphor unit through a transmissive window. The phosphor unit receives the blue excitation light and generates light having a wide wavelength distribution including a large amount of green wavelength component. The combiner combines, on the visible light reflection film, the light generated on the phosphor unit and the red light from the second light source. The optical system equalizes the combined light into flat light and then guides the flat light.

CITATION LIST

Patent Literature

PTL 1: Unexamined Japanese Patent Publication No. 2013-195822

SUMMARY

The present disclosure provides a light source unit and an illuminating device that can emit light having a desired illuminance distribution by using fluorescence emission by a phosphor.

A light source unit according to an aspect of the present disclosure includes: a phosphor; a condenser lens; a first light source part; and a second light source part. The phosphor emits fluorescent light based on first excitation light and second excitation light. The condenser lens condenses the first excitation light and the second excitation light on the phosphor. The first light source part emits the first excitation light such that the first excitation light forms a first light intensity distribution on the phosphor. The second light source part emits the second excitation light such that the second excitation light forms a second light intensity distribution different from the first light intensity distribution, on the phosphor.

A light source unit according to another aspect of the present disclosure includes a light source that emits excitation light; a phosphor that emits fluorescent light, based on the excitation light; and a condenser lens that condenses the excitation light onto the phosphor. The light source emits the excitation light toward the condenser lens differently from collimated light traveling along an optical axis of the condenser lens.

An illuminating device according to an aspect of the present disclosure includes: the light source unit of the present disclosure; and a spatial light modulation element that spatially modulates light from the light source unit.

A light source unit and an illuminating device according to the present disclosure can emit light having a desired illuminance distribution.

DESCRIPTION OF EMBODIMENTS

Hereinafter, exemplary embodiments will be described in detail with reference to the drawings as appropriate. However, an unnecessarily detailed description will be omitted in some cases. For example, a detailed description of a well-known matter and a duplicated description of substantially the same configuration will be omitted in some cases. This is to avoid the following description from being unnecessarily redundant and to thus help those skilled in the art to easily understand the description.

Note that the applicant provides the attached drawings and the following description to help those skilled in the art to sufficiently understand the present disclosure, and the applicant does not intend to use the drawings or the description to limit the subject matter of the claims.

First Exemplary Embodiment

In a first exemplary embodiment, a light source unit according to the present disclosure and an illuminating device including the light source unit will be described by using an application example for in-vehicle use.

1. Configuration 1-1. Outline

Figure 1:
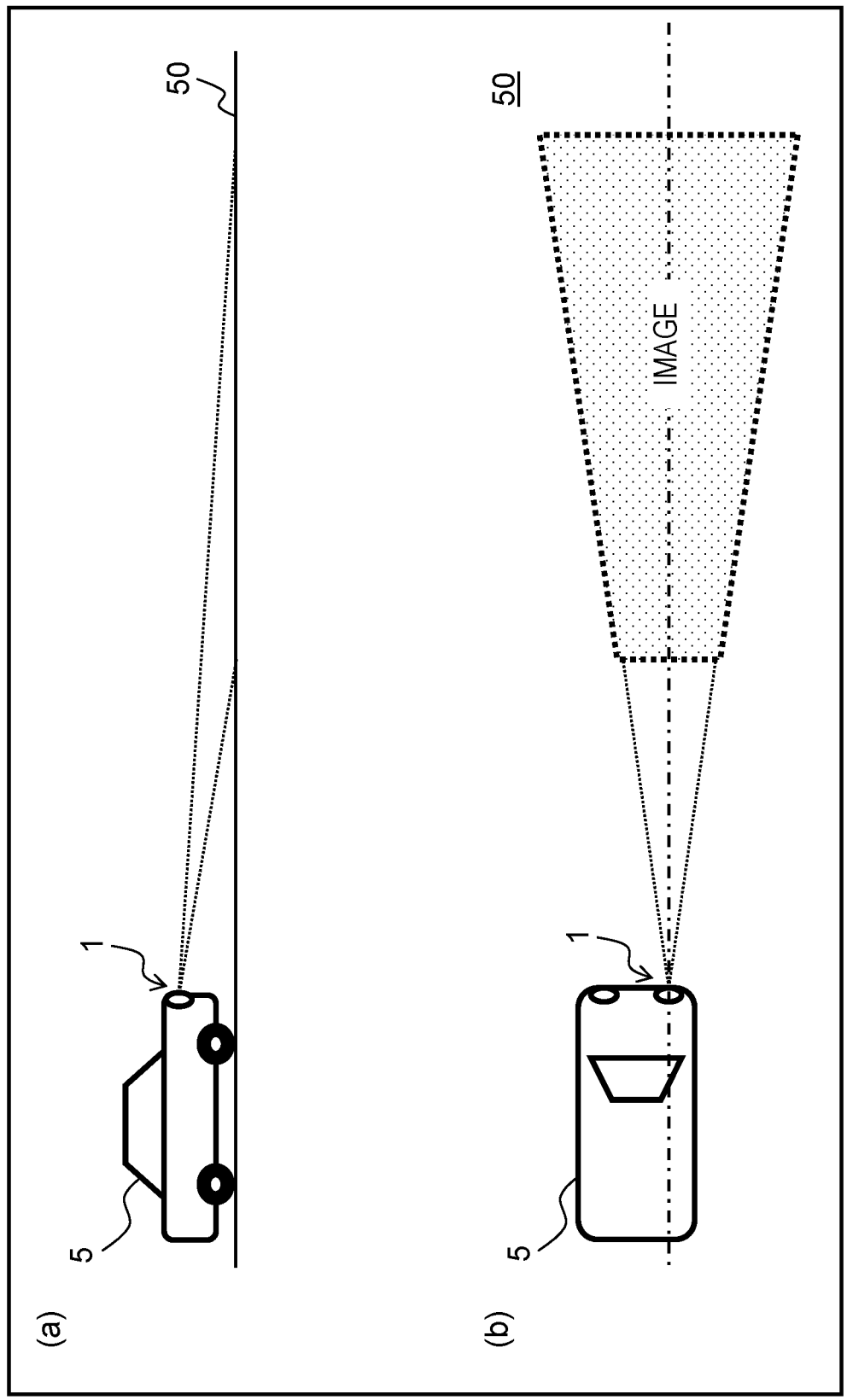
FIG. 1 is a diagram for describing an application example of an illuminating device according to a first exemplary embodiment.

An outline of the illuminating device according to the present exemplary embodiment will be described with reference to FIG. 1. FIG. 1 is a diagram for describing an application example of illuminating device 1 for in-vehicle use according to the present exemplary embodiment.

Part (a) of FIG. 1 shows a side view of vehicle 5 equipped with illuminating device 1. Part (b) of FIG. 1 shows a plan view of vehicle 5 equipped with illuminating device 1 that projects an image on road surface 50. As shown in FIG. 1, illuminating device 1 according to the present exemplary embodiment can be used as, for example, a headlight of vehicle 5.

Illuminating device 1 irradiates road surface 50 with illumination light obtained by spatially modulating light generated by a light source unit in a similar manner to, for example, a digital light processing (DLP) type projector. With this configuration, illuminating device 1 can achieve, as a headlight of vehicle 5, various functions, for example, an adaptive driving beam (ADB) function and an adaptive front-lighting system (AFS) function. In addition, as shown in part (b) of FIG. 1, it is possible to draw an image including various types of information on road surface 50.

Illuminating device 1 according to the present exemplary embodiment includes a light source unit in which illumination light can be switched between a low beam and a high beam in vehicle 5. Hereinafter, configurations of illuminating device 1 and the light source unit will be described.

1-2. Configuration of Illuminating Device

Figure 2:
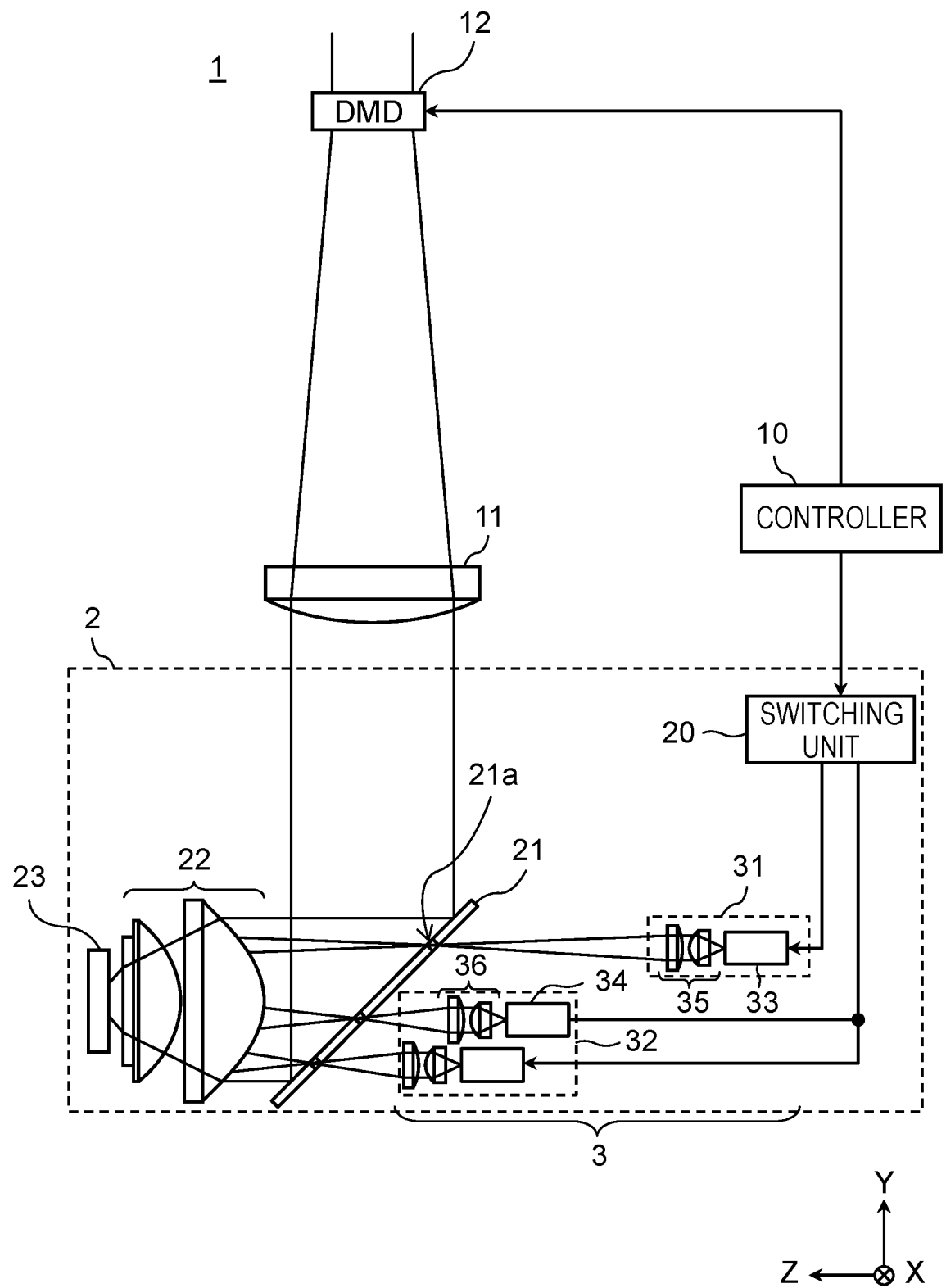
FIG. 2 is a diagram showing a configuration of the illuminating device according to the first exemplary embodiment.

A configuration of illuminating device 1 according to the present exemplary embodiment will be described with reference to FIG. 2. FIG. 2 is a diagram showing the configuration of illuminating device 1.

Illuminating device 1 according to the present exemplary embodiment include, as shown in FIG. 2, light source unit 2, relay lens 11, digital mirror device (DMD) 12, and controller 10. Light source unit 2 includes light source 3, switching unit 20, mirror 21, condenser lens 22, and phosphor 23.

Light source unit 2 according to the present exemplary embodiment is a module that generates white light by using fluorescence emission by phosphor 23 and emits the white light as output light. Hereinafter, an emitting direction of the output light from light source unit 2 is a Y direction, a direction in which phosphor 23 is irradiated with excitation light in light source unit 2 is a Z direction, and a direction orthogonal to the Y direction and the Z direction is an X direction.

Light source 3 emits excitation light having a wavelength range by which phosphor 23 is excited. In the present exemplary embodiment, light source 3 emits blue light as the excitation light. In the present exemplary embodiment, light source 3 includes: first light source part 31 that emits excitation light (first excitation light) for a low beam; and second light source part 32 that emits excitation light (second excitation light) for a high beam.

First light source part 31 includes light source element 33 and emission lens 35. First light source part 31 may include a plurality of sets of light source element 33 and emission lens 35. Light source element 33 is configured with, for example, a laser light source such as a semiconductor laser (LD) that emits blue light. Light source element 33 may be configured with, for example, a light emitting diode (LED) instead of the laser light source. Emission lens 35 includes one or more lenses and includes, for example, a collimator lens and a diverging lens.

Second light source part 32 includes one or a plurality of sets of light source element 34 and emission lens 36, similarly to light source element 33 and emission lens 35 of first light source part 31. In first and second light source parts 31, 32, it is possible to use light source elements 33, 34 that are different in, for example, light intensity, beam diameter, or aspect ratio of the beam diameter, from each other.

First and second light source parts 31, 32 are disposed such that directions of optical axes, in each of which excitation light is emitted from each of light source elements 33, 34 through each of the emission lenses 35, 36, are parallel to the Z direction. In the present exemplary embodiment, a focal length or the like of each of emission lenses 35, 36 is adjusted such that the excitation light from corresponding light source element 33, 34 is condensed at a predetermined condensing point in a spot shape.

In the present exemplary embodiment, angles at which the excitation light from light source element 33 and excitation light from light source element 34 are respectively converged in emission lenses 35, 36 are set such that a beam of the excitation light having passed the condensing point is diverged in different angles (divergence angles) between first light source part 31 and second light source part 32. Functions of first and second light source parts 31, 32 will be described later.

Switching unit 20 is configured with, for example, a switching circuit, and switching unit 20 switches the combinations of on and off of first and second light source parts 31, 32 in light source 3, following an instruction of controller 10. For example, there are four combinations: first and second light source parts 31, 32 are both on; any one of first and second light source parts 31, 32 is on, and the other one is off; and first and second light source parts 31, 32 are both off. Thus, switching unit 20 switches light intensity distributions of excitation light L1, L2 on phosphor 23 by combining emission and non-emission of the excitation light of first light source part 31 and the excitation light of second light source part 32. Switching unit 20 may include a drive circuit for each of light source elements 33, 34 in light source 3.

Mirror 21 is configured with, for example, a transparent substrate on which a light reflection film such as metal is formed, and has a reflection surface that reflects light. Mirror 21 is disposed between light source 3 and phosphor 23 with the reflection surface directed to phosphor 23 (positive Z side) so that light traveling in a negative Z direction is reflected in a positive Y direction. Mirror 21 may be configured with a metal substrate or the like.

In mirror 21, there are formed a plurality of openings 21a through which light passes. Each opening 21a is provided corresponding to each of light source elements 33, 34 and has, for example, a size larger than a beam diameter of each excitation light such that an optical axis of each of light source elements 33, 34 of first and second light source parts 31, 32 can pass through each opening 21a. Openings 21a are formed of, for example, physical holes in mirror 21. Openings 21a are not limited to the above holes and may be formed of, for example, areas where a metal film is not formed on the transparent substrate of mirror 21. Further, positions of openings 21a of mirror 21 are located, for example, not near a center but near an outer periphery of mirror 21.

Condenser lens 22 includes one or a plurality of lenses and has a specific optical axis and a specific focal position. Condenser lens 22 is disposed between mirror 21 and phosphor 23 such that a direction of the optical axis is directed in the Z direction and the focal position is located on a principal surface of phosphor 23. Note that the focal position of condenser lens 22 may be in the vicinity of the principal surface of phosphor 23, for example, in a range of a thickness of phosphor 23.

In the present exemplary embodiment, phosphor 23 emits fluorescent light of yellow light, based on excitation light of blue light and contains, for example, a fluorescent material such as yttrium aluminum garnet (YAG). Further, on phosphor 23 in the present exemplary embodiment, there is provided a reflection surface configured with a light reflection film made of metal or the like or with another member, where the reflection surface is provided on the opposite side (positive Z side) of phosphor 23 to a light entering side of excitation light. Phosphor 23 is disposed with the principal surface being parallel to an XY plane, for example.

In light source unit 2 according to the present exemplary embodiment, part of incident blue light is converted into yellow light on phosphor 23, and the converted yellow light and remaining blue light are used to generate white light. A size such as a thickness of phosphor 23 is appropriately set from the point of view of a conversion factor of conversion from excitation light (blue light) into fluorescent light (yellow light).

In illuminating device 1, relay lens 11 includes one or a plurality of lenses and is disposed between mirror 21 of light source unit 2 and DMD 12. The direction of an optical axis of relay lens 11 is set parallel to the Y direction. Relay lens 11 guides the output light of light source unit 2 to DMD 12 such that the output light is transferred.

DMD 12 is an example of a spatial light modulation element having a spatial optical modulation surface whose pixels are configured with micromirrors. DMD 12 generates illumination light by spatially modulating the light guided from relay lens 11 under pixel control of controller 10, for example. Note that, in illuminating device 1, the spatial light modulation element is not limited to DMD 12, and various spatial light modulation elements such as a liquid crystal panel may be used.

Controller 10 is a control device that controls each part of illuminating device 1. Controller 10 includes, for example, a central processing unit (CPU) or a micro processing unit (MPU) that implements predetermined functions in cooperation with software. Further, controller 10 includes a communication interface or the like that communicates with an internal memory such as a flash memory and an external device. Controller 10 reads out data and a program stored in the internal memory and performs various types of arithmetic processing to implement various functions.

Controller 10 may be a hardware circuit such as a dedicated electronic circuit designed to implement a predetermined function or a reconfigurable electronic circuit. Controller 10 may be configured with various semiconductor integrated circuits such as a CPU, an MPU, a microcomputer, a digital signal processor (DSP), a field programmable gate array (FPGA), and an application specific integrated circuit (ASIC).

2. Operation

Hereinafter, a description will be given on operation of illuminating device 1 and light source unit 2 configured as described above.

In illuminating device 1 according to the present exemplary embodiment (FIG. 2), light source 3 of light source unit 2 emits excitation light from light source elements 33, 34 through emission lenses 35, 36. The excitation light from light source 3 travels in the positive Z direction while being condensed at the condensing points. The condensing points of the excitation light are each set in the vicinity of corresponding opening 21a of mirror 21. With this configuration, the excitation light from light source 3 passes through openings 21a while being more converged than in the vicinities of emission lenses 35, 36.

The excitation light having passed the condensing points (in the vicinities of openings 21a) enters condenser lens 22 while diverging, is condensed when passing through condenser lens 22, and is irradiated on the principal surface of phosphor 23. Phosphor 23 emits fluorescent light, depending on the irradiated excitation light. The emitted fluorescent light (yellow light) and remaining excitation light (blue light) that has not been converted into the fluorescent light are reflected by the reflection surface of phosphor 23 and are emitted from a negative Z side of phosphor 23.

Condenser lens 22 receives the light emitted from phosphor 23 and emits the received light toward mirror 21 such that a spreading pattern of the received light is enlarged and transferred. Mirror 21 reflects the light from condenser lens 22 in the positive Y direction. The reflected light from mirror 21 contains also blue light (remaining excitation light) in addition to yellow light (fluorescent light) and constitutes white light. As described above, light source unit 2 generates white light and outputs the white light from mirror 21 as the output light.

In illuminating device 1, the white light from light source unit 2 is supplied to DMD 12 through relay lens 11 such that the white light is transferred. Controller 10 of illuminating device 1 generates illumination light by controlling DMD 12 to spatially modulate the supplied white light. The illumination light generated on DMD 12 is appropriately emitted ahead or the like of vehicle 5 through an external projection lens (not shown) or the like (see FIG. 1).

By the above operation, illuminating device 1 generates the white light in light source unit 2 by using the fluorescence emission by phosphor 23. In this case, since an optical path on which various types of light are reflected is used in mirror 21 and phosphor 23, light source unit 2 and illuminating device 1 can be downsized.

In addition, since light source 3 emits the excitation light such that the excitation light is converged in openings 21a as described above, the sizes of openings 21a in mirror 21 can be set minute. With this configuration, it is possible to reduce loss in light intensity, where the loss in light intensity is caused by leakage of the light generated in phosphor 23 through openings 21a when the light generated in phosphor 23 is reflected by mirror 21. Note that the condensing point at which convergence of each beam of the excitation light is completed may be inside or outside of corresponding opening 21a in the vicinity of openings 21a.

2-1. Illuminance Distribution

Figure 3:
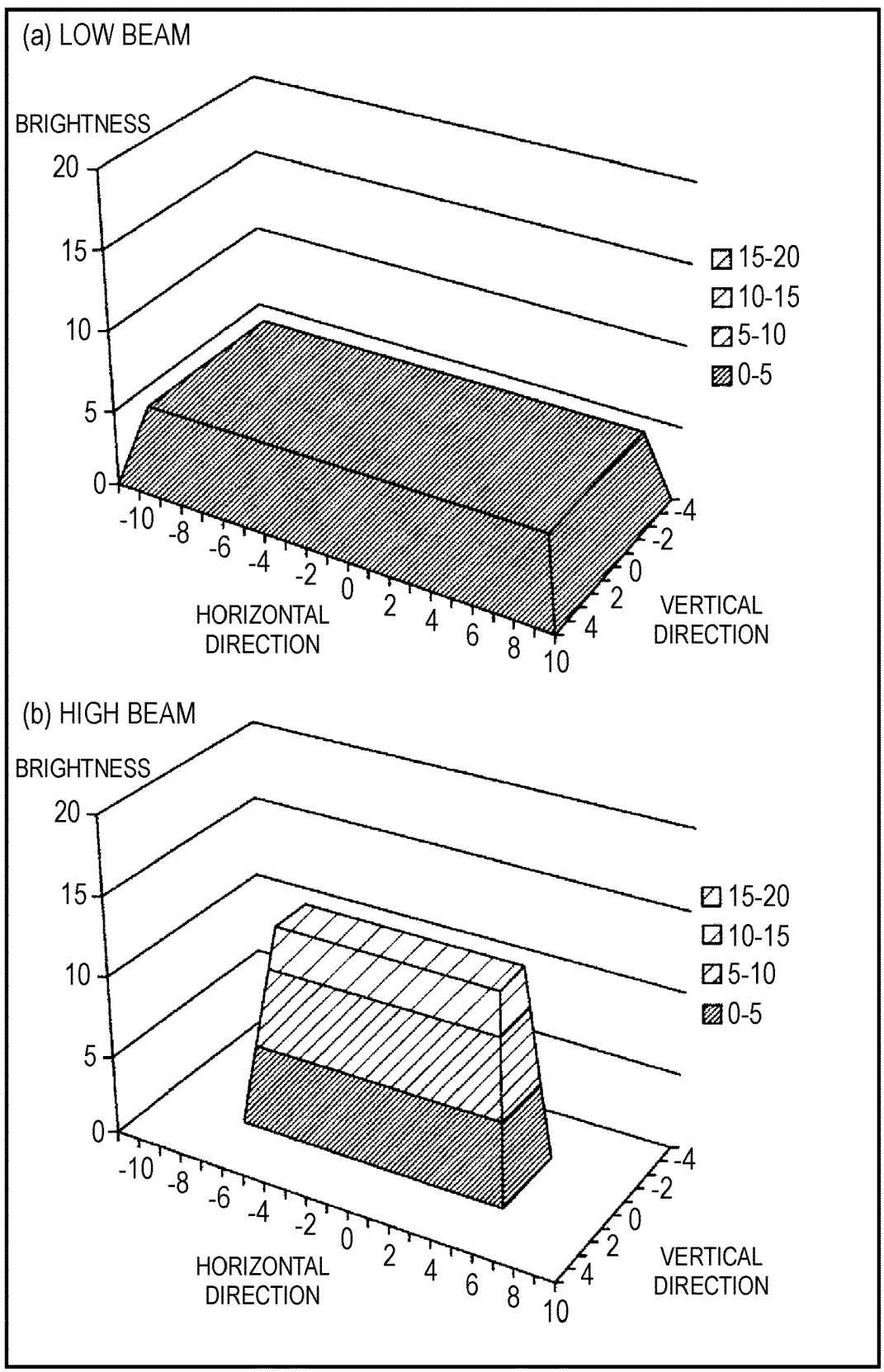
FIG. 3 is a diagram for describing an issue related to an illuminance distribution.

Illuminating device 1 according to the present exemplary embodiment generates illumination light of a high beam and a low beam, on the basis of the above illumination operation. With reference to FIG. 3, a description will be given on an issue related to an illuminance distribution in the illumination operation using DMD 12.

Part (a) of FIG. 3 is an example of an illuminance distribution on DMD 12 for emitting illumination light of a low beam. Part (b) of FIG. 3 is an example of an illuminance distribution on DMD 12 for emitting illumination light of a high beam.

FIG. 3 shows brightness (illuminance) distributed in a horizontal direction and a vertical direction on the spatial optical modulation surface (a field angle of the illumination light) of DMD 12. A position in the horizontal direction corresponds to an angle in a width direction of vehicle 5 (see part (b) of FIG. 1), and a position in a vertical direction corresponds to an angle in a height direction of vehicle 5 (see part (a) of FIG. 1).

In the illumination light of a low beam shown in part (a) of FIG. 3, the illuminance distribution is set to a wide-area illuminance distribution that covers the entire field angle of DMD 12. By causing DMD 12 to spatially modulate the light having such an illuminance distribution, it is possible to generate illumination light of a low beam, where in the illumination light of a low beam, the light intensity at vertical position corresponding to an area at a large angle in the height direction of vehicle 5 is reduced, for example.

In the illumination light of a high beam shown in part (b) of FIG. 3, the illuminance is higher in a central area in the field angle of DMD 12 than the illuminance in the case of part (a) of FIG. 3, and the illuminance in the periphery around the central area is lower than in the case of part (a) of FIG. 3. To achieve the illuminance distribution of such a high beam with illuminating device 1, it is necessary to supply to DMD 12 light having an illuminance higher than or equal to the illuminance in part (b) of FIG. 3.

In this case, if the light having the same light intensity distribution as in the case of the high beam is supplied to DMD 12 in the case of the low beam, it is necessary to reduce the light intensity in the central area on DMD 12, so that loss in light intensity is increased. To address this issue, in the present exemplary embodiment, light source unit 2 of illuminating device 1 has two light source parts (first light source part 31 and second light source part 32) so that the light intensity distributions of the output light can be switched. With this configuration, in illuminating device 1, it is possible to efficiently obtain the illumination light having two different illuminance distributions as shown in FIG. 3.

2-2. Light Source Unit

A description will be given on a function of light source unit 2 according to the present exemplary embodiment with reference to FIGS. 4, 5, and 6.

Figure 4:
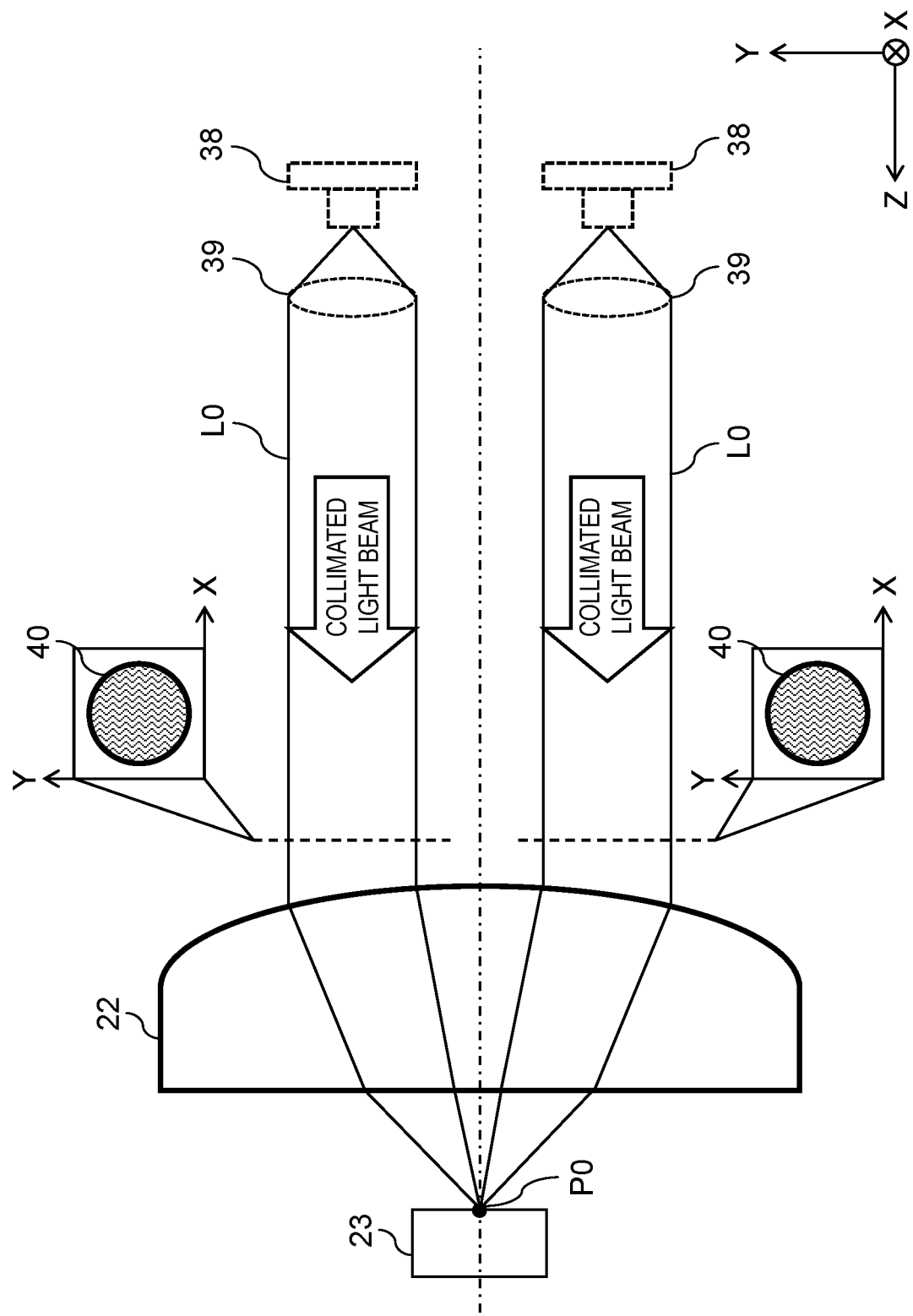
FIG. 4 is a diagram for describing a function of a condenser lens of a light source unit.

FIG. 4 is a diagram for describing a function of condenser lens 22 of light source unit 2. FIG. 5 is a diagram for describing light source unit 2 according to the present exemplary embodiment. FIG. 6 is a diagram showing an example of a light intensity distribution on phosphor 23 in the first exemplary embodiment. Note that in FIGS. 4 and 5, there are simplification in various ways such as omission of mirror 21 for the sake of convenience of description (the same hereinafter).

FIG. 4 shows an example of a case in which excitation light emitted from light source elements 38 is converted into collimated light beams L0 by emission lenses 39 and in which collimated light beams L0 traveling in the positive Z direction along an optical axis of condenser lens 22 enter condenser lens 22. In this case, as shown in FIG. 4, a cross-section of each collimated light beam L0 along the XY plane is substantially constant from the emission from each emission lens 39 to the entrance into condenser lens 22, and is the same cross-section (incidence cross-section) 40 as the cross-section of the light beam entering into condenser lens 22 in the vicinity of condenser lens 22. Further, hereinafter, focal position P0 of condenser lens 22 is located on the principal surface of phosphor 23.

In the example shown in FIG. 4, when collimated light beams L0 travel in the positive Z direction along the optical axis of condenser lens 22 and enter condenser lens 22, condenser lens 22 condenses collimated light beams L0 at focal position P0 on the principal surface of phosphor 23. Therefore, the light intensity of collimated light beams L0 irradiated on phosphor 23 is concentrated only at focal position P0. In such a case, the fluorescent light and the like emitted by phosphor 23 diverge only from focal position P0 and are parallelized through condenser lens 22. Therefore, DMD 12 is supplied with light that has a uniform illuminance distribution.

In light source unit 2 according to the present exemplary embodiment, diverging light is used as excitation light instead of collimated light beams L0 described above. In the present exemplary embodiment, by differentiating a divergence angle of the diverging light between first and second light source parts 31, 32, the illuminance distributions of the output light are made different. Functions of first and second light source parts 31, 32 will be described with reference to FIG. 5.

Figure 5:
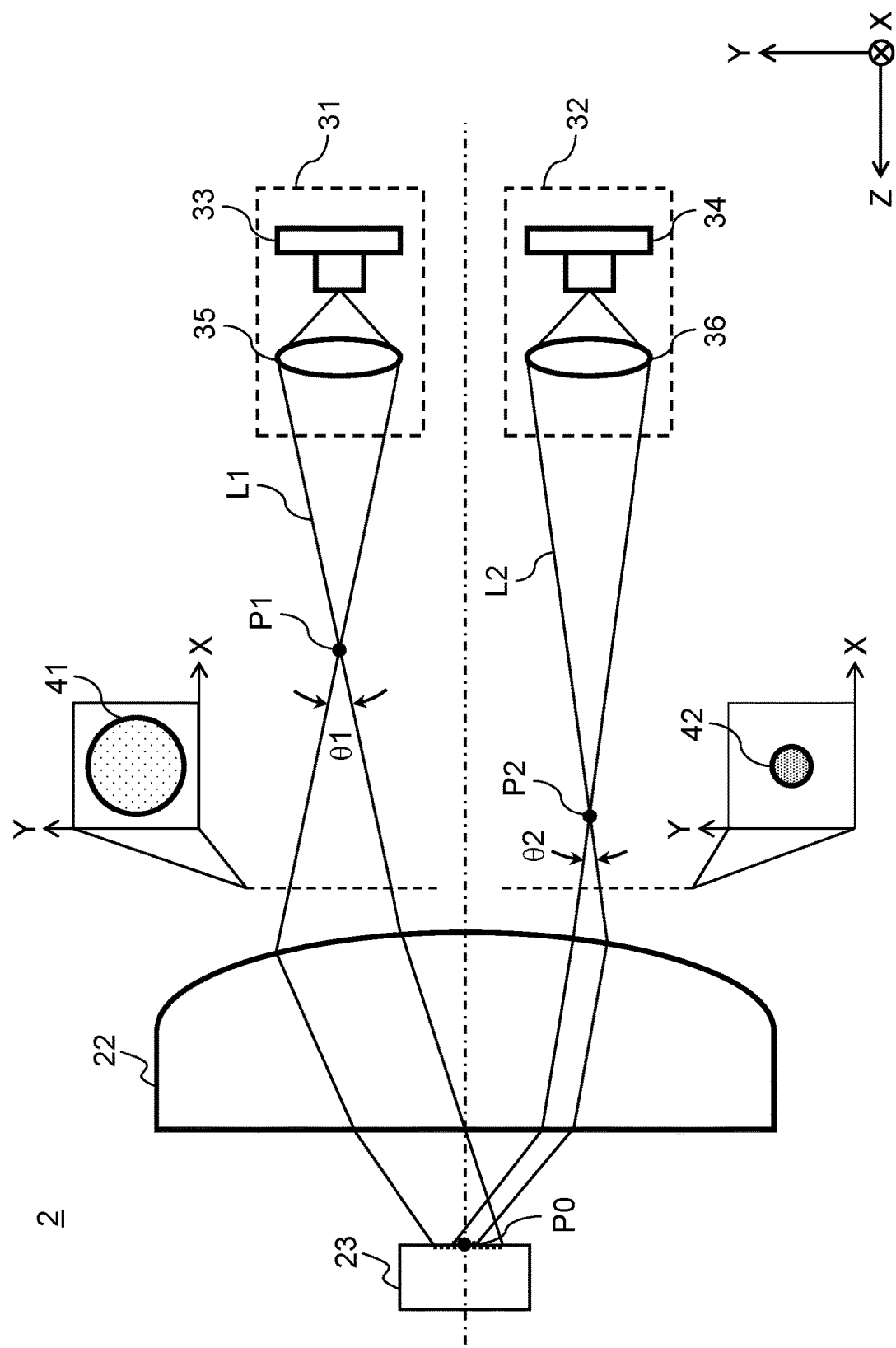
FIG. 5 is a diagram showing a configuration of the light source unit according to the first exemplary embodiment.

As shown in FIG. 5, in first light source part 31, excitation light L1 is condensed at condensing point P1 and is diverged from condensing point P1 at divergence angle θ1. Further, in second light source part 32, excitation light L2 is condensed at condensing point P2 and is diverged from condensing point P2 at divergence angle θ2. Regarding divergence angles θ1, θ2, divergence angle θ1 of excitation light L1 emitted from first light source part 31 is set larger than divergence angle θ2 of excitation light L2 emitted from second light source part 32.

Since excitation light L1 from first light source part 31 enters condenser lens 22 as diverging light having divergence angle θ1, excitation light L1 is irradiated on phosphor 23 through an optical path in condenser lens 22, and this optical path is spread more than the optical path that makes collimated light beams L0 (FIG. 4) be condensed at one point at focal position P0. With this configuration, excitation light L1 forms, on phosphor 23, the distribution of light intensity that is spread out from focal position P0 to an extent corresponding to divergence angle θ1 (see FIG. 6).

In addition, excitation light L2 from second light source part 32 is irradiated on phosphor 23 through condenser lens 22 as diverging light having divergence angle θ2 in a similar manner to excitation light L1 from first light source part 31. In this case, excitation light L1, L2 enter condenser lens 22 in different incident states because divergence angles θ1, θ2 are different between first and second light source parts 31, 32. The incident states of excitation light L1, L2 each include a size, a shape, and a position (with respect to the optical axis of condenser lens 22 or the like) of an area in which the light beam of each of excitation light L1, L2 passes through a surface on a light entering side of condenser lens 22, in addition, an incident angle of each of excitation light L1, L2 with respect to condenser lens 22.

FIG. 5 shows, as an example of the incident states of excitation light L1, L2, incidence cross-sections 41, 42 of light beams of excitation light L1, L2 along the same XY plane in the vicinity of and on a light entering side of condenser lens 22.

When divergence angles θ1, θ2 satisfy the relation θ2<θ1, the size of incidence cross-section 42 of excitation light L2 from second light source part 32 is smaller than the size of incidence cross-section 41 of excitation light L1 from first light source part 31, as shown in FIG. 5. Therefore, excitation light L2 from second light source part 32 is irradiated on phosphor 23, having a distribution that is narrower than a light intensity distribution of first excitation light L1 and is spread out from focal position P0.

Figure 6:
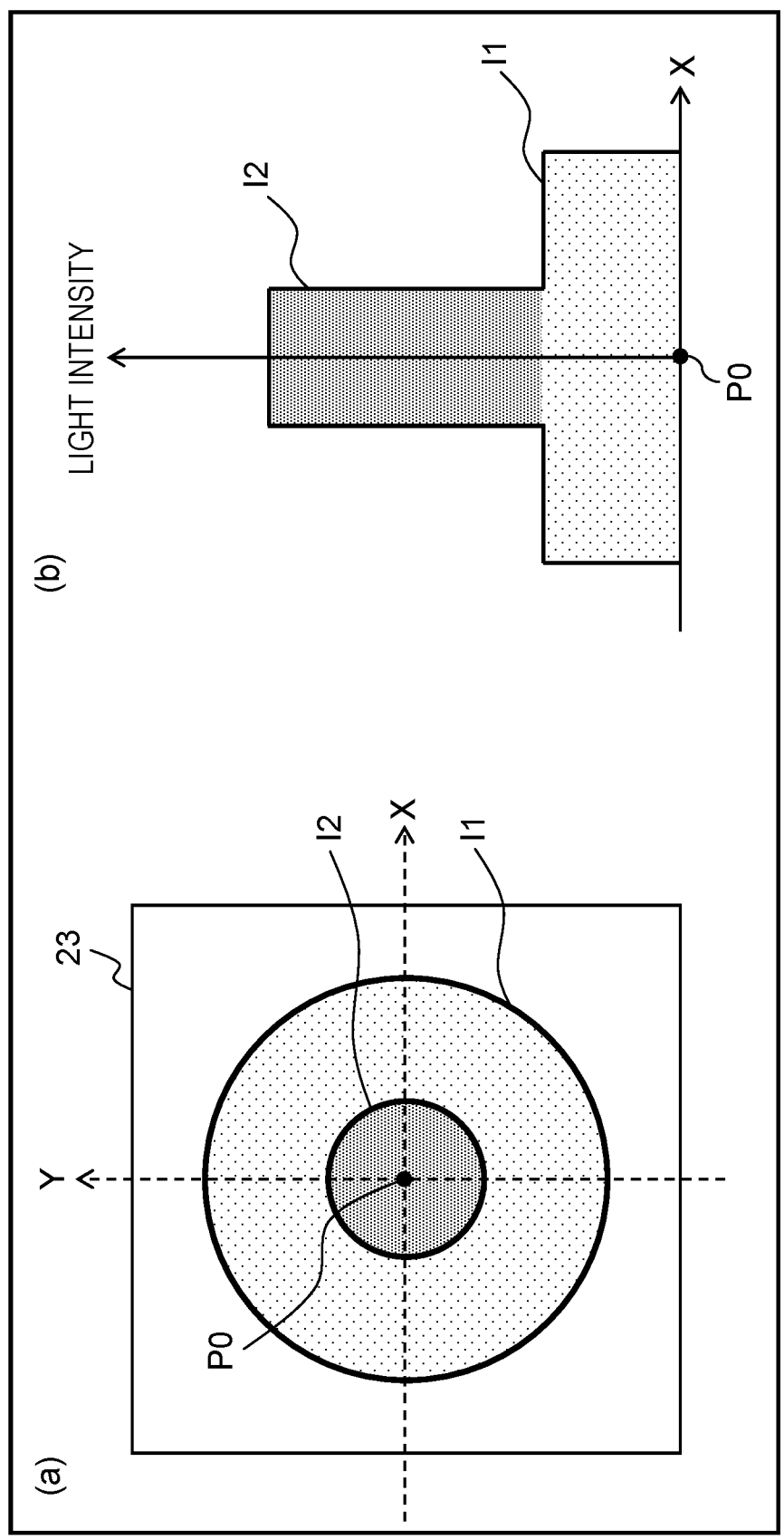
FIG. 6 is a diagram showing an example of a light intensity distribution on a phosphor in the first exemplary embodiment.

FIG. 6 shows an example of the light intensity distribution of excitation light L1, L2 on phosphor 23. Part (a) of FIG. 6 shows an example of the light intensity distribution of the excitation light on the principal surface of phosphor 23 (XY plane). Part (b) of FIG. 6 shows an example of the light intensity distribution of the excitation light in the X direction of part (a) of FIG. 6.

FIG. 6 shows the light intensity distribution of excitation light L1, L2 on phosphor 23 when excitation light L1, L2 are irradiated simultaneously from first light source part 31 and second light source part 32. In this case, as shown in FIG. 6, the light intensity distribution on phosphor 23 includes low component I1 based on excitation light L1 from first light source part 31 and high component I2 based on excitation light L2 from second light source part 32, and each of components I1, I2 is spread out from focal position P0. Low component I1 has a large area in the direction parallel to the XY plane and has a small light intensity peak, and high component I2 has a small area in the direction parallel to the XY plane and has a large light intensity peak.

On phosphor 23, fluorescent light is generated in the areas on which radiated excitation light L1, L2 are distributed, depending on the light intensity distribution of excitation light L1, L2, and fluorescent light and reflected light of the excitation light are generated. Therefore, the light emitted from phosphor 23 has a spatial distribution (illuminance distribution) corresponding to the light intensity distribution of irradiated excitation light L1, L2. The light emitted from phosphor 23 is enlarged and transferred by condenser lens 22 as described above (see FIG. 2), is reflected by mirror 21, and is then irradiated on DMD 12 through relay lens 11 while the spatial distribution is being maintained.

By using diverging light having divergence angles θ1, θ2 as described above, it is possible to change an illuminance distribution of light supplied to DMD 12 by controlling the light intensity distributions of excitation light L1, L2 on phosphor 23.

Note that, a positional relationship between first and second light source parts 31, 32 shown in FIG. 5 is an example and may be changed as appropriate. For example, first light source part 31 may be disposed on a negative Y side (second light source part 32 is disposed on a positive Y side), or first light source part 31 may be disposed closer to condenser lens 22 than second light source part 32 is. If one of first and second light source parts 31, 32 having a larger spot (or incidence cross-section 41, 42) on condenser lens 22 is located closer to condenser lens 22, it is possible to reduce an influence of aberrations of condenser lens 22.

2-3. Switching Operation of Illumination Light

Illuminating device 1 according to the present exemplary embodiment performs a switching operation that switches illumination light between a high beam and a low beam, on the basis of the above function of light source unit 2. Hereinafter, the switching operation of the illumination light on illuminating device 1 will be described with reference to FIGS. 7, 8, and 9.

Figure 7:
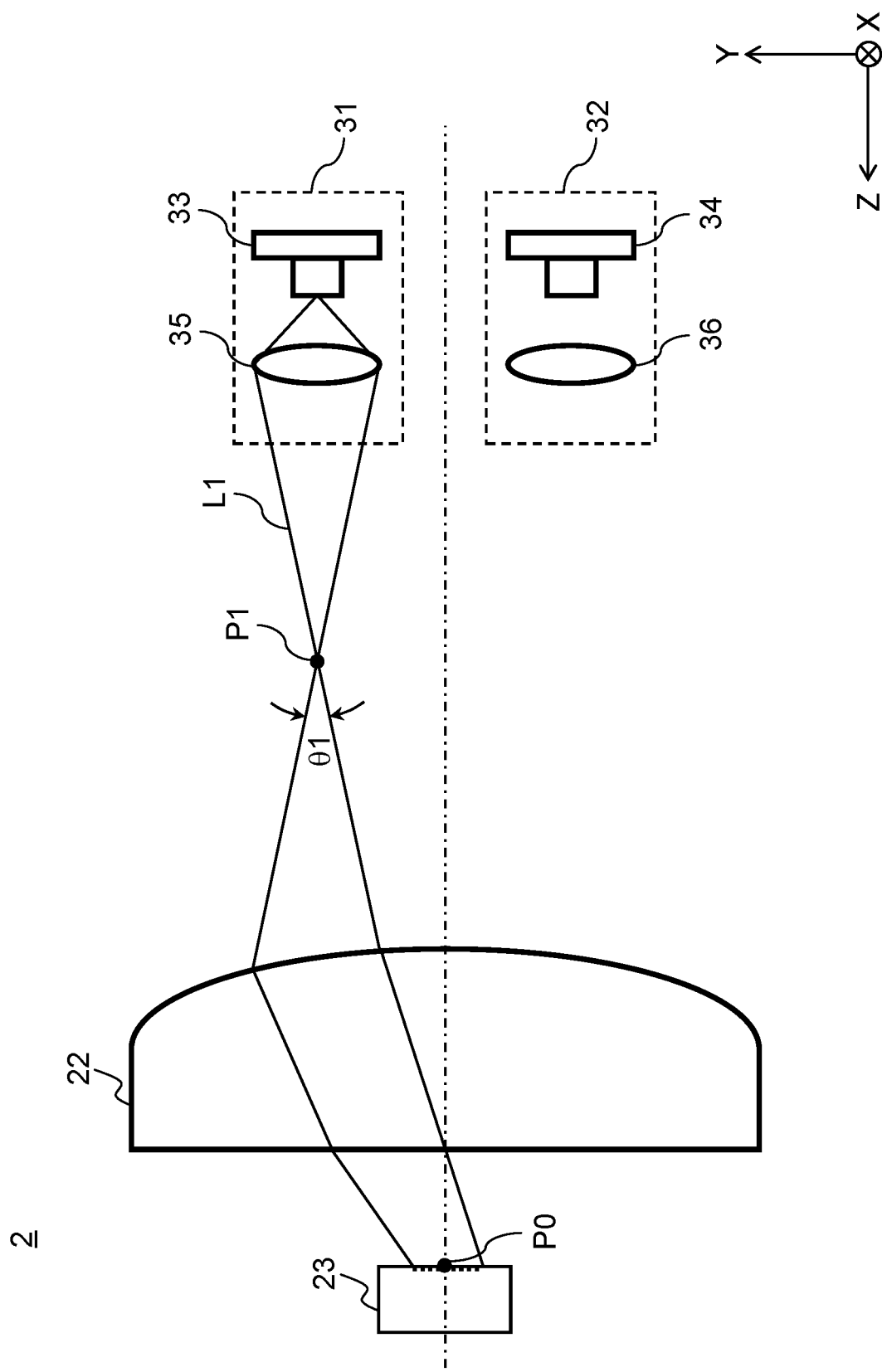
FIG. 7 is a diagram for describing a first operation mode of the light source unit.
Figure 8:
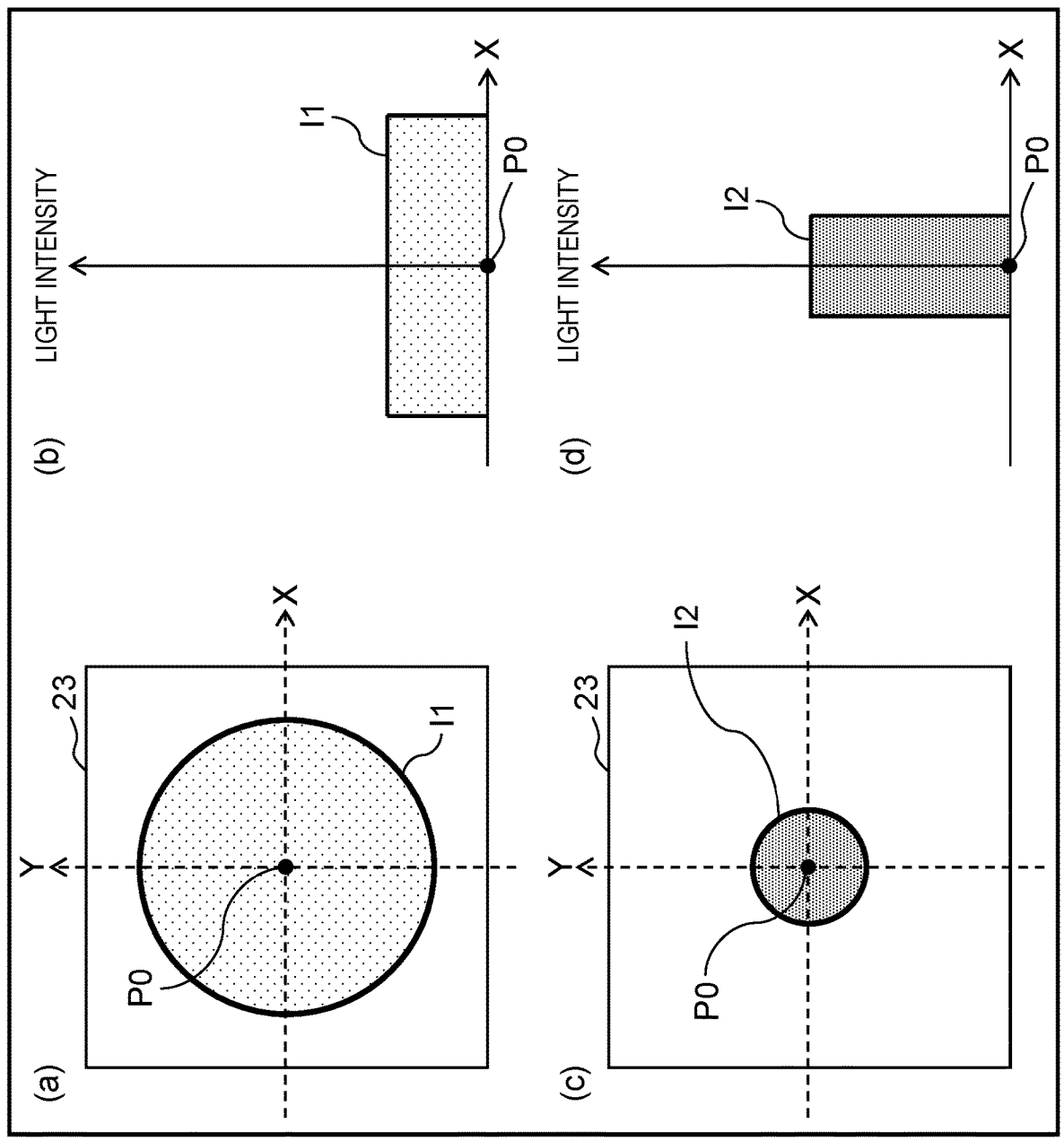
FIG. 8 is a diagram for describing a light intensity distribution on the phosphor depending on a switching operation of illumination light.
Figure 9:
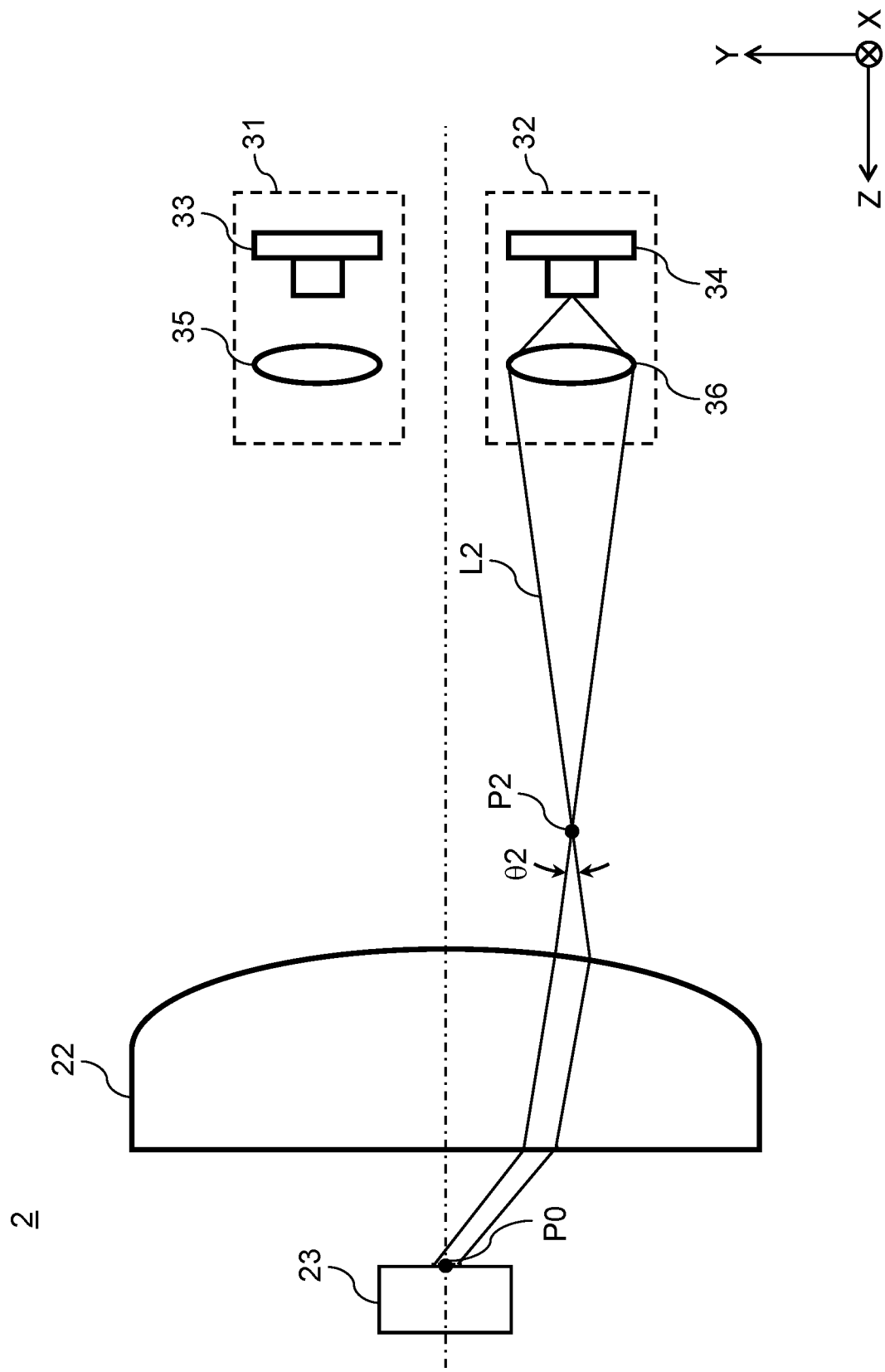
FIG. 9 is a diagram for describing a second operation mode of the light source unit.

FIG. 7 is a diagram for describing a first operation mode (low mode) in the switching operation of the illumination light of light source unit 2. FIG. 8 is a diagram for describing the light intensity distribution on the phosphor in the switching operation of the illumination light. FIG. 9 is a diagram for describing a second operation mode (high mode) of light source unit 2.

In illuminating device 1 according to the present exemplary embodiment (FIG. 2), when an instruction of turning on the low beam is entered by an operation of a user such as a driver of vehicle 5, controller 10 sets switching unit 20 and DMD 12 to the low mode. The low mode is the operation mode for generating illumination light of the low beam in illuminating device 1.

When switching unit 20 is set to the low mode, switching unit 20 turns on first light source part 31 while keeping second light source part 32 off. By this operation, in light source unit 2 in the low mode, as shown in FIG. 7, excitation light L1 from first light source part 31 is irradiated on phosphor 23 through condenser lens 22. Parts (a) and (b) of FIG. 8 each show an example of the light intensity distribution of excitation light L1 in the low mode.

As shown in parts (a) and (b) of FIG. 8, in the low mode, the light intensity distribution of low component I1 based on excitation light L1 from first light source part 31 is formed on phosphor 23 (an example of the first light intensity distribution). Phosphor 23 generates light corresponding to excitation light L1 having such a light intensity distribution, and light source unit 2 supplies to DMD 12 white light having an illuminance distribution similar to the light intensity distribution shown in parts (a) and (b) of FIG. 8.

DMD 12 modulates, under the control of controller 10, the supplied white light, which has the illuminance distribution similar to the light intensity distribution shown in parts (a) and (b) of FIG. 8, and DMD 12 emits the illumination light of the low beam (see part (a) of FIG. 3).

Alternatively, when an instruction of turning on of the high beam is entered by, for example, an operation of a user, controller 10 sets the switching unit 20 and DMD 12 to the high mode. The high mode is the operation mode for generating illumination light of the high beam in illuminating device 1.

When switching unit 20 is set to the high mode, switching unit 20 turns on second light source part 32 while keeping first light source part 31 off. By this operation, in light source unit 2 in the high mode, as shown in FIG. 9, excitation light L2 from second light source part 32 is irradiated on phosphor 23 through condenser lens 22. Parts (c) and (d) of FIG. 8 each show an example of the light intensity distribution of excitation light L2 in the high mode.

As shown in parts (c) and (d) of FIG. 8, in the high mode, the light intensity distribution of high component I2 based on excitation light L2 from second light source part 32 is formed on phosphor 23 (an example of the second light intensity distribution). Phosphor 23 generates light corresponding to excitation light L2 having such a light intensity distribution, and light source unit 2 supplies to DMD 12 white light having an illuminance distribution similar to the light intensity distribution shown in parts (c) and (d) of FIG. 8.

DMD 12 modulates, under the control of controller 10, the supplied white light, which has an illuminance distribution similar to the light intensity distribution shown in parts (c) and (d) of FIG. 8, and DMD 12 emits the illumination light of the high beam (see part (b) of FIG. 3).

The above operation switches the light intensity distributions of excitation light L1, L2 on phosphor 23 between the low mode and the high mode. As shown in parts (a) and (c) of FIG. 8, the light intensity distribution in the low mode (part (a) of FIG. 8) is spread out in a wider area than the light intensity distribution in the high mode (part (c) of FIG. 8).

Further, as shown in parts (b) and (d) of FIG. 8, the light intensity distribution in the high mode (part (d) of FIG. 8) has larger light intensity in the vicinity of the center than the light intensity distribution in the low mode (part (c) of FIG. 8).

As described above, by controlling the light intensity distributions of excitation light L1, L2 on phosphor 23, it is possible to supply the output light by light source unit 2 to DMD 12 while setting the output light to a desired illuminance distribution. Note that the operation modes of light source unit 2 are not limited to the above-described low mode and high mode, and it is possible to use an operation mode in which first and second light source parts 31, 32 are simultaneously turned on, for example (see FIG. 6).

3. Effects and the Like

As described above, light source unit 2 according to the present exemplary embodiment includes: phosphor 23; condenser lens 22; first light source part 31; and second light source part 32. Phosphor 23 emits fluorescent light on the basis of excitation light L1, L2. Condenser lens 22 condenses excitation light L1, L2 on phosphor 23. First light source part 31 emits first excitation light L1 such that first excitation light L1 forms the first light intensity distribution on phosphor 23. Second light source part 32 emits second excitation light L2 such that second excitation light L2 forms, on the phosphor, the second light intensity distribution different from the first light intensity distribution.

With light source unit 2 described above, the illuminance distribution of the light emitted from phosphor 23 is changed by differentiating the light intensity distributions, of excitation light L1, L2, formed on phosphor 23 from each other. With this configuration, light source unit 2 can emit the output light in a desired illuminance distribution by using the fluorescence emission by phosphor 23.

In the present exemplary embodiment, there is a difference between the incident state in which excitation light L1 emitted from first light source part 31 enters condenser lens 22 and the incident state in which excitation light L2 emitted from second light source part 32 enters condenser lens 22. With this configuration, first and second light source parts 31, 32 can form, on phosphor 23, light intensity distributions different from each other.

Further, in the present exemplary embodiment, light source unit 2 further includes switching unit 20 that switches between first light source part 31 and second light source part 32. The switching operation of the illumination light can be performed by switching unit 20.

Further, in the present exemplary embodiment, first light source part 31 includes emission lens 35 (first emission lens) that sets an angle of spreading of the light beam of exiting excitation light L1 to divergence angle θ1 (first angle). Second light source part 32 includes emission lens 36 (second emission lens) that sets an angle of spreading of the light beam of exiting excitation light L2 to divergence angle θ2 (second angle) different from divergence angle θ1. By adjusting divergence angles θ1, θ2, the light intensity distribution on phosphor 23 can be changed.

Further, in the present exemplary embodiment, light source unit 2 further includes mirror 21 that is disposed between light source 3 and condenser lens 22 to reflect the light entering from condenser lens 22. Mirror 21 includes: opening 21a (first opening) through which an optical axis of first light source part 31 passes; and opening 21a (second opening) through which an optical axis of second light source part 32 passes. Since the optical axis of each of light source parts 31, 32 passes through the corresponding opening 21a, it is possible to prevent or reduce deformation of the light intensity distributions, of excitation light L1, L2, on phosphor 23 due to aberrations.

Further, in the present exemplary embodiment, first light source part 31 emits excitation light L1 such that excitation light L1 converges at opening 21a (first opening). Second light source part 32 emits excitation light L2 such that excitation light L2 converges at opening 21a (second opening). This configuration can set the size of each opening 21a to be minute and can thus reduce loss, in the light intensity of the output light of light source unit 2, at each opening 21a.

Further, in the present exemplary embodiment, light source 3 includes a laser light source. The laser light source can provide high-power excitation light and can increase the fluorescence emission on phosphor 23.

Further, light source unit 2 according to the present exemplary embodiment includes: light source 3 that emits excitation light; phosphor 23 that emits fluorescent light on the basis of the excitation light; and condenser lens 22 that condenses the excitation light from light source 3 on phosphor 23. Light source 3 emits the excitation light toward condenser lens 22 differently from collimated light beam L0 traveling along the optical axis of condenser lens 22.

Light source unit 2 described above can form, on phosphor 23, a light intensity distribution different from a light intensity distribution based on excitation light from collimated light beams L0, and light source unit 2 can emit output light from light source unit 2 in a desired illuminance distribution by using fluorescence emission on phosphor 23.

Further, illuminating device 1 according to the present exemplary embodiment incudes light source unit 2 and DMD 12. DMD 12 spatially modulates light containing the fluorescent light generated on phosphor 23. With this configuration, DMD 12 can generate illumination light (including image light) in a desired illuminance distribution.

Second Exemplary Embodiment

Hereinafter, a second exemplary embodiment will be described with reference to FIGS. 10 and 11. In the first exemplary embodiment, in light source unit 2, divergence angles θ1, θ2 of excitation light L1, L2 are set different from each other. In the second exemplary embodiment, condensing points P1, P2 of excitation light L1, L2 are displaced from each other.

Hereinafter, a light source unit according to the present exemplary embodiment will be described, but descriptions of a configuration and operation similar to those of illuminating device 1 and light source unit 2 according to the first exemplary embodiment will be appropriately omitted.

Figure 10:
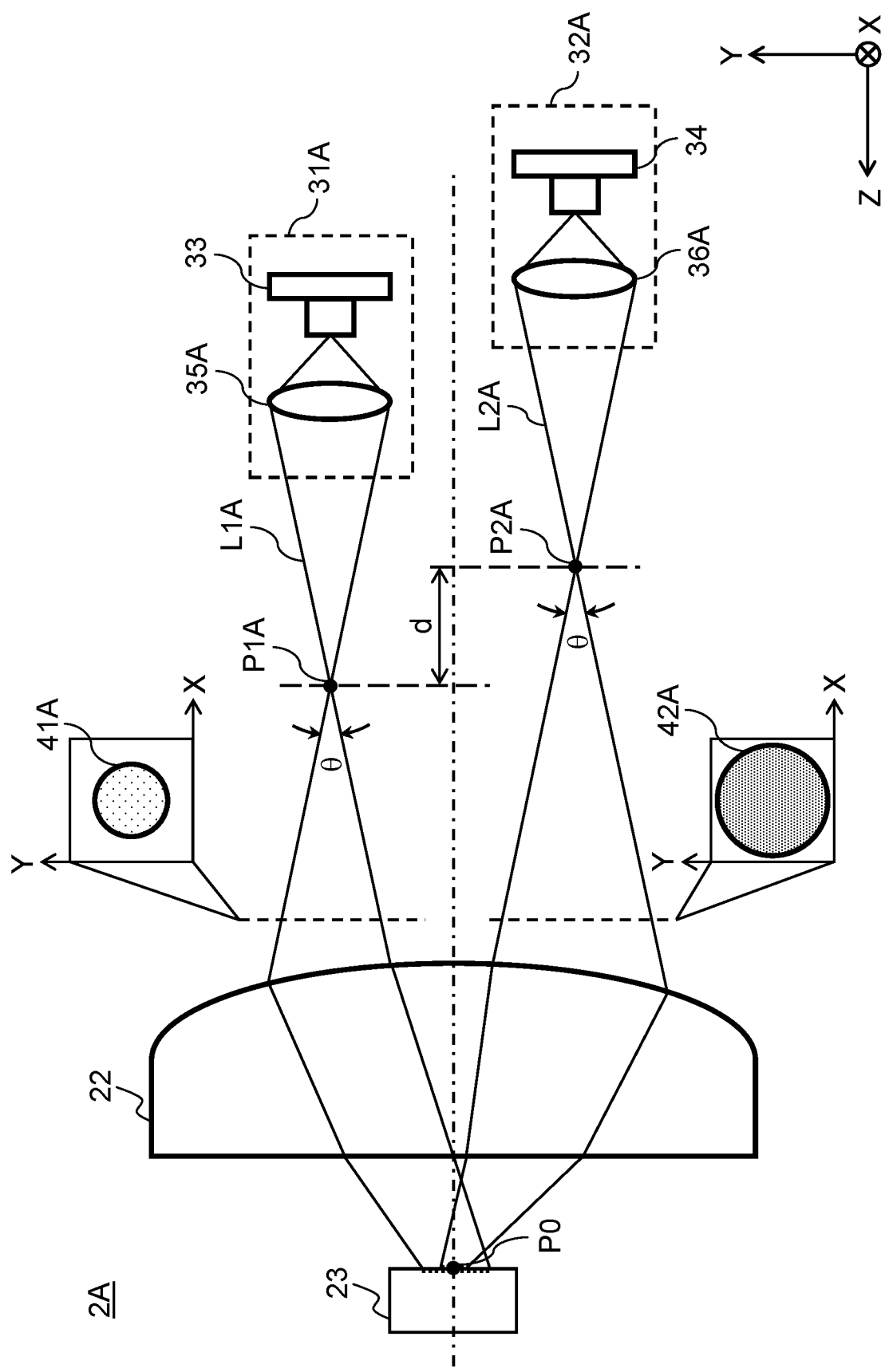
FIG. 10 is a diagram showing a configuration of a light source unit according to a second exemplary embodiment.

FIG. 10 is a diagram showing a configuration of light source unit 2A according to the second exemplary embodiment. In light source unit 2A according to the present exemplary embodiment, as shown in FIG. 10, the positions, of first and second light source parts 31A, 32A, in the Z direction are displaced from each other. Further, in the following description, there will be described an example in which first light source part 31A includes: light source element 33; and emission lens 35A, second light source part 32A includes: light source element 34; and emission lens 36A, and common divergence angle θ is set for first and second light source parts 31A, 32A.

In the example of FIG. 10, condensing point P1A of first light source part 31A and condensing point P2A of second light source part 32A are disposed to be separated from each other by a distance d in the Z direction. Since condensing point P2A of second light source part 32A is more distant from condenser lens 22 than condensing point P1A of first light source part 31A is, a size of incidence cross-section 42A of excitation light L2A from second light source part 32A is larger than a size of incidence cross-section 41A of excitation light L1A from first light source part 31A.

Excitation light L1A, L2A having above incidence cross-sections 41A, 42A and divergence angles θ are each radiated on phosphor 23 through condenser lens 22. In this case, excitation light L2A from second light source part 32A is narrowed more by condenser lens 22 than excitation light L1A from first light source part 31A. FIG. 11 shows light intensity distributions of excitation light L1A, L2A on phosphor 23 in the present example.

Figure 11:
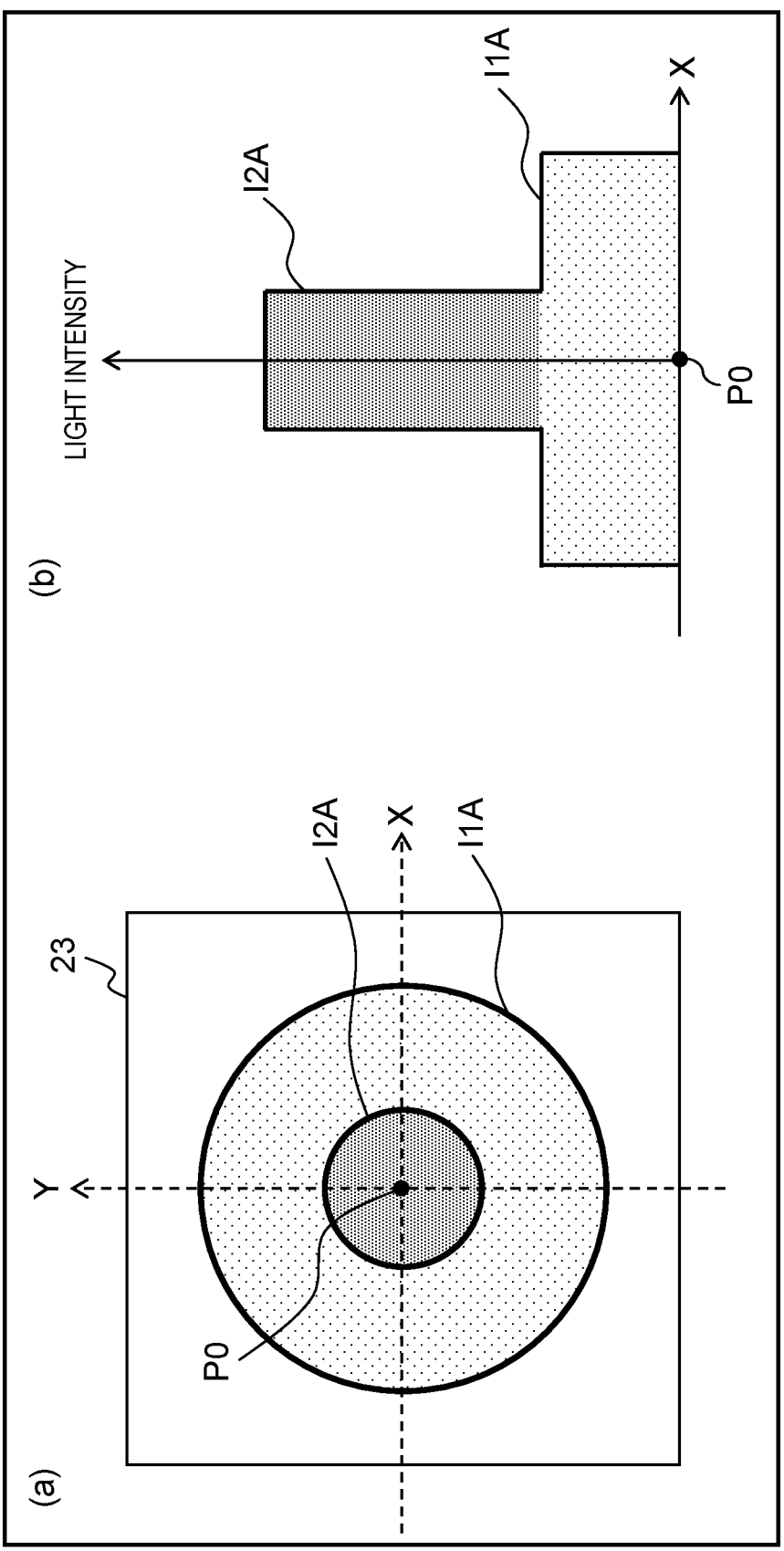
FIG. 11 is a diagram showing an example of a light intensity distribution on a phosphor in the second exemplary embodiment.

Part (a) of FIG. 11 shows the light intensity distribution of excitation light on a principal surface of phosphor 23 in the example of FIG. 10. Part (b) of FIG. 11 shows the light intensity distribution of the excitation light in the X direction of part (a) of FIG. 11.

In the light intensity distribution on phosphor 23 shown in FIG. 11, low component I1A is based on excitation light L1A from first light source part 31A, and high component I2A is based on excitation light L2A from second light source part 32A. As shown in FIG. 11, by locating condensing point P1A closer to condenser lens 22, an light intensity distribution is obtained that is spread out in a wide area like low component I1A, and by locating condensing point P2A farther from condenser lens 22, a light intensity distribution is obtained that is localized at a center like high component I2A.

In the above description, the disposition of first and second light source parts 31A, 32A is modified to differentiate the distances from condensing points P1A, P2A to condenser lens 22; however, instead of this, various settings may be made to differentiate optical path lengths from light source units 31A, 32A to condenser lens 22.

As described above, in light source unit 2A according to the present exemplary embodiment, there is a difference between the optical path length from first light source part 31A to condenser lens 22 and the optical path length from second light source part 32A to condenser lens 22. Also with the above configuration, it is possible to change the light intensity distributions, of excitation light L1A, L2A, on phosphor 23 and to thus control the illuminance distribution of the output light (emitted light from phosphor 23) of light source unit 2A.

Further, in the above description, the description is given on the case where divergence angles θ of first and second light source parts 31A, 32A are identical; however, instead of this, the divergence angles of first and second light source parts 31A, 32A may be made different similarly to the divergence angles in the first exemplary embodiment. For example, in the first and second light source parts, one of the light source units having the smaller divergence angle can be located closer to condenser lens 22 to reduce an overall size. Alternatively, one of light source units having the smaller divergence angle can be located farther from condenser lens 22 to obtain a good light intensity distribution on phosphor 23.

Third Exemplary Embodiment

Hereinafter, a third exemplary embodiment will be described with reference to FIGS. 12 and 13. In the third exemplary embodiment, there will be described an example in which an optical axis of excitation light is displaced to control a position of a light intensity distribution.

Hereinafter, a light source unit according to the present exemplary embodiment will be described, but descriptions of a configuration and operation similar to those of illuminating device 1 and light source unit 2 according to the first exemplary embodiment will be appropriately omitted.

Figure 12:
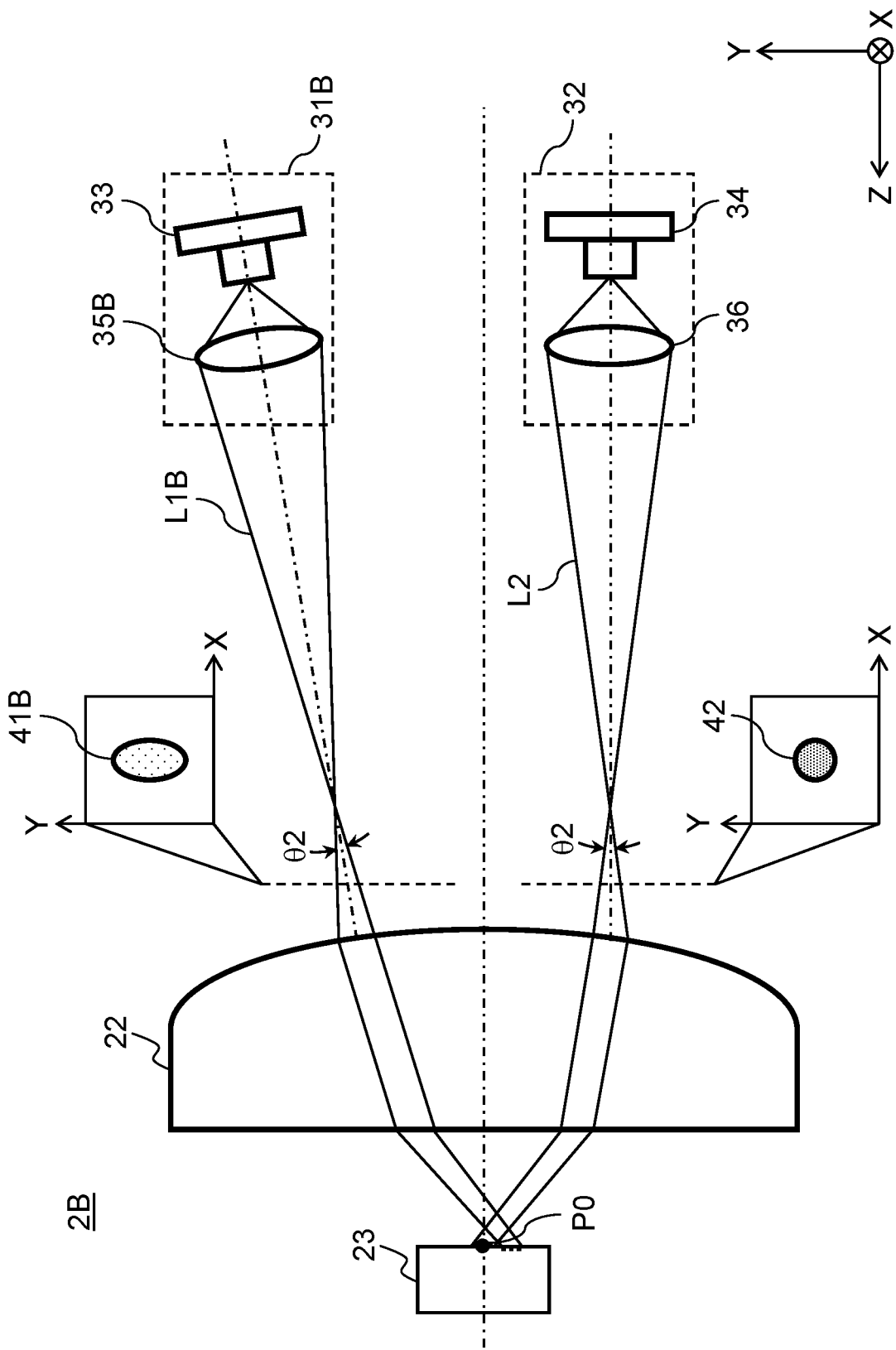
FIG. 12 is a diagram showing a configuration of a light source unit according to a third exemplary embodiment.

FIG. 12 is a diagram showing a configuration of light source unit 2B according to the third exemplary embodiment. In light source unit 2B according to the present exemplary embodiment, compared with light source unit 2 of the first exemplary embodiment, an optical axis (on an emission side) of first light source part 31B is tilted from the Z direction to a negative Y side, as shown in FIG. 12. Further, in the following description, there will be described an example in which first light source part 31B includes light source element 33 and emission lens 35B, and an divergence angle of first light source part 31B is set equal to divergence angle θ2 of second light source part 32.

In the example of FIG. 12, an optical axis of first light source part 31B is tilted further to the negative Y side than an optical axis of second light source part 32 parallel to Z direction is. In other words, the optical axis of second light source part 32 is substantially parallel to an optical axis of condenser lens 22, but the optical axis of first light source part 31B is not parallel to the optical axis of condenser lens 22 but tilted. Therefore, a shape of incidence cross-section 41B of excitation light L1B from first light source part 31B is elongated more in Y direction than a shape of incidence cross-section 42 of excitation light L2 from second light source part 32. FIG. 13 shows light intensity distributions of excitation light L1B, L2 on phosphor 23 in the present example.

Figure 13:
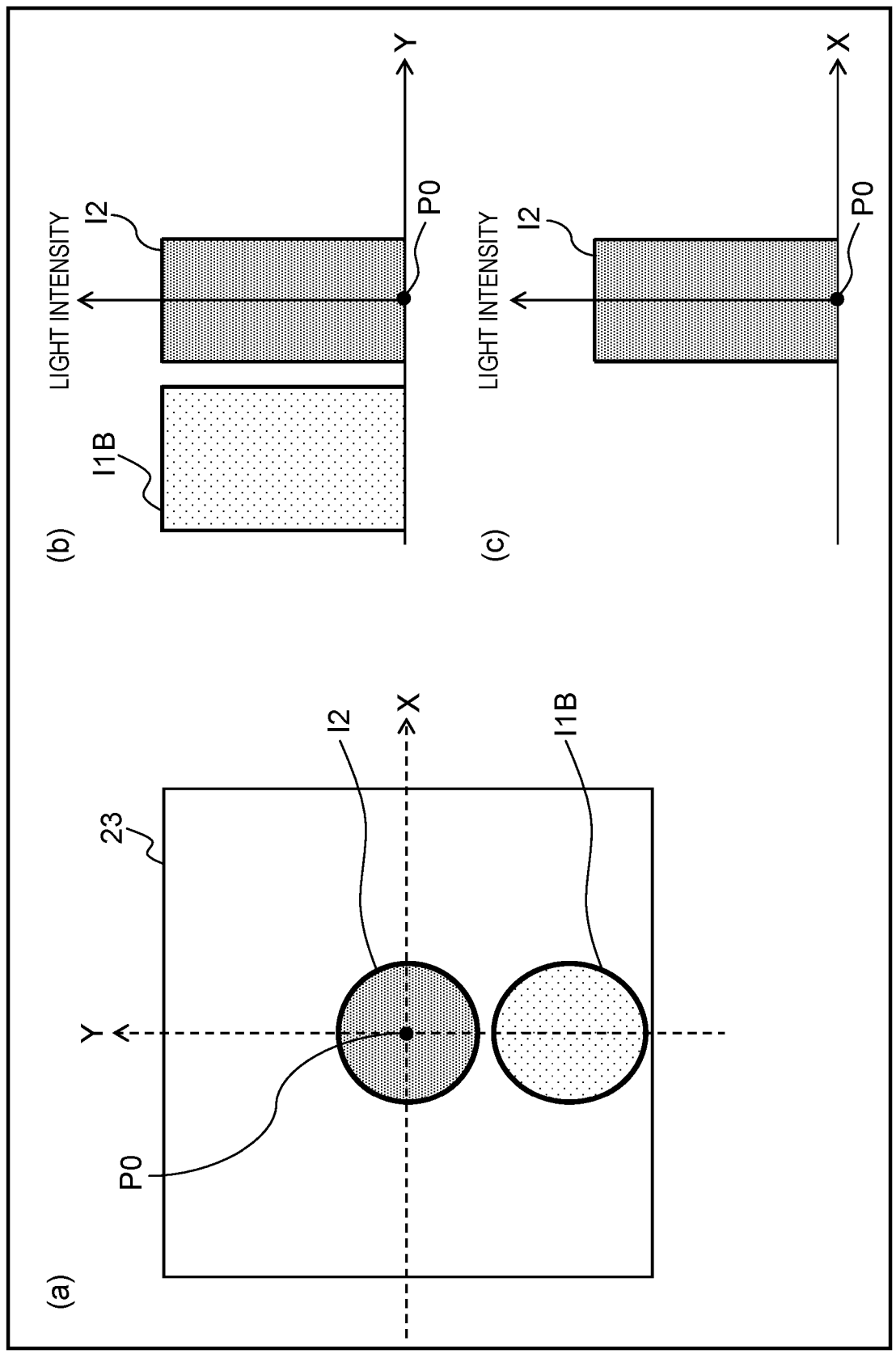
FIG. 13 is a diagram showing an example of a light intensity distribution on a phosphor in the third exemplary embodiment.

Part (a) of FIG. 13 shows the light intensity distribution of the excitation light on a principal surface of phosphor 23 in the example of FIG. 12. Part (b) of FIG. 13 shows the light intensity distribution of the excitation light in the Y direction of part (a) of FIG. 13. Part (c) of FIG. 13 shows the light intensity distribution of the excitation light in the X direction of part (a) of FIG. 13.

As shown in FIG. 13, the light intensity distribution on phosphor 23 of the present example includes: high component I2 similar to that in the first exemplary embodiment; and shifted component I1B based on excitation light L1B from first light source part 31B. Shifted component I1B is shifted more to the negative Y side than high component I2 is, to an extent corresponding to magnitude of tilt of the optical axis of first light source part 31B. As described above, by tilting the optical axis of first light source part 31B, which emits excitation light L1B, with respect to a position parallel to the optical axis of condenser lens 22, a position (light intensity distribution) of the excitation light irradiated on phosphor 23 can be controlled.

As described above, in light source unit 2B according to the present exemplary embodiment, there is a difference between a direction of the optical axis of first light source part 31B and a direction of the optical axis of second light source part 32. With this configuration, it is possible to variously change the position of the excitation light irradiated on phosphor 23 and to thus control an illuminance distribution of the output light of light source unit 2B in various manners.

Fourth Exemplary Embodiment

Hereinafter, a fourth exemplary embodiment will be described with reference to FIGS. 14 and 15. In the first exemplary embodiment, condensing points P1, P2 each are set for each of excitation light L1, L2. In the fourth exemplary embodiment, there will be described an example in which excitation light has no condensing point.

Hereinafter, a light source unit according to the present exemplary embodiment will be described, but descriptions of a configuration and operation similar to those of illuminating device 1 and light source unit 2 according to the first exemplary embodiment will be appropriately omitted.

Figure 14:
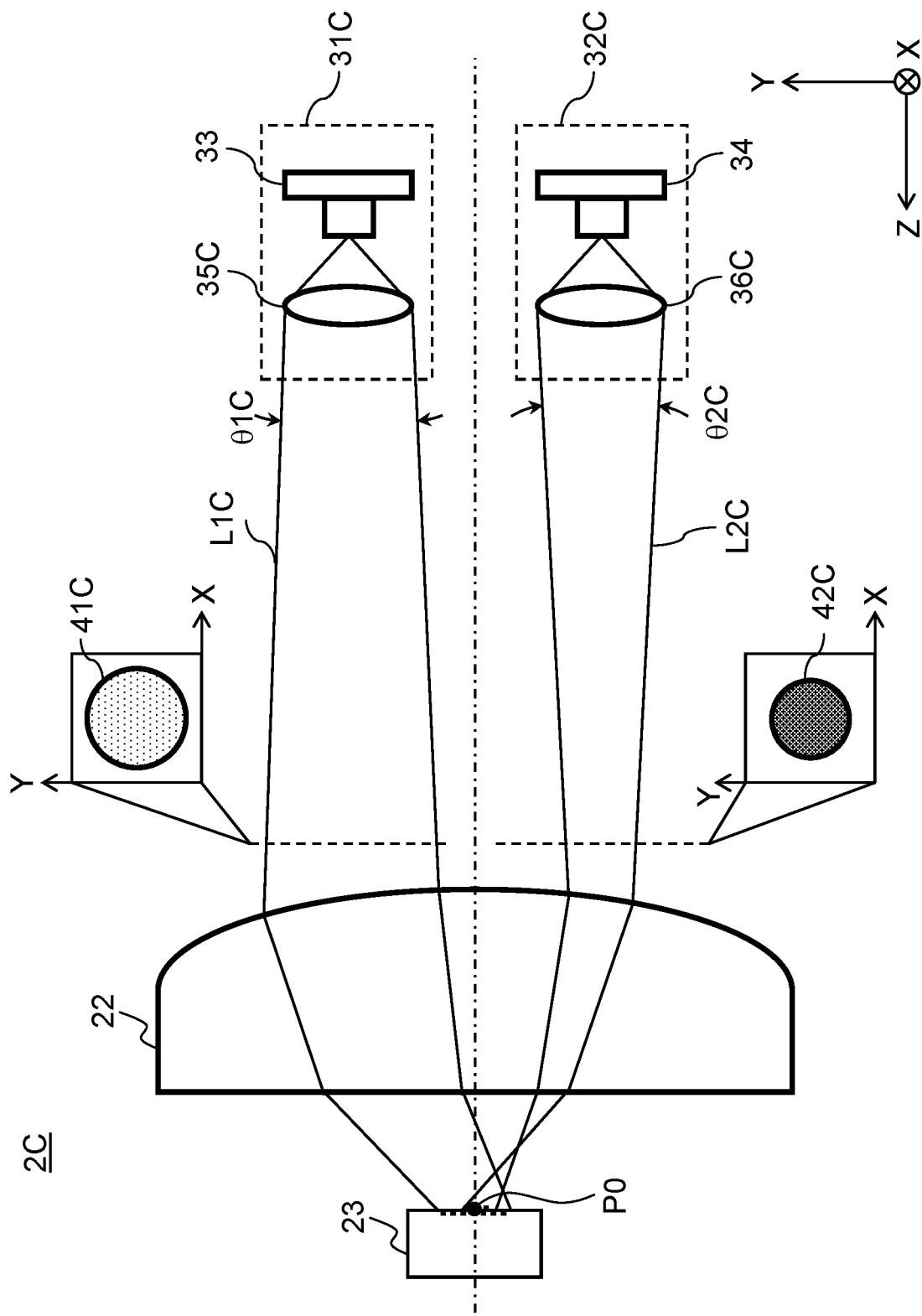
FIG. 14 is a diagram showing a configuration of a light source unit according to a fourth exemplary embodiment.

FIG. 14 is a diagram showing a configuration of light source unit 2C according to the fourth exemplary embodiment. In light source unit 2C according to the present exemplary embodiment, in a configuration similar to that in the first exemplary embodiment, no condensing point is provided on any of optical paths, of excitation light L1C, L2C, from first and second light source parts 31C, 32C to condenser lens 22, as shown in FIG. 14.

In the present exemplary embodiment, regarding first light source part 31C, angle θ1C of spreading of a light beam of excitation light L1C is set at emission lens 35C such that excitation light L1C reaches condenser lens 22 from emission lens 35C while diverging. Further, regarding second light source part 32C, angle θ2C of spreading of a light beam of excitation light L2C is set at emission lens 36C such that excitation light L2C from light source element 34 is converged but does not create a condensing point on an optical path to condenser lens 22.

With the above configuration, excitation light L1C from first light source part 31C enters condenser lens 22 while diverging, and excitation light L2C from second light source part 32C enters condenser lens 22 while converging. Therefore, a size of incidence cross-section 41C of excitation light L1C from first light source part 31C is larger than a size of incidence cross-section 42C of excitation light L2C from second light source part 32C. FIG. 15 shows light intensity distributions of excitation light L1C, L2C on phosphor 23 in the present example.

Figure 15:
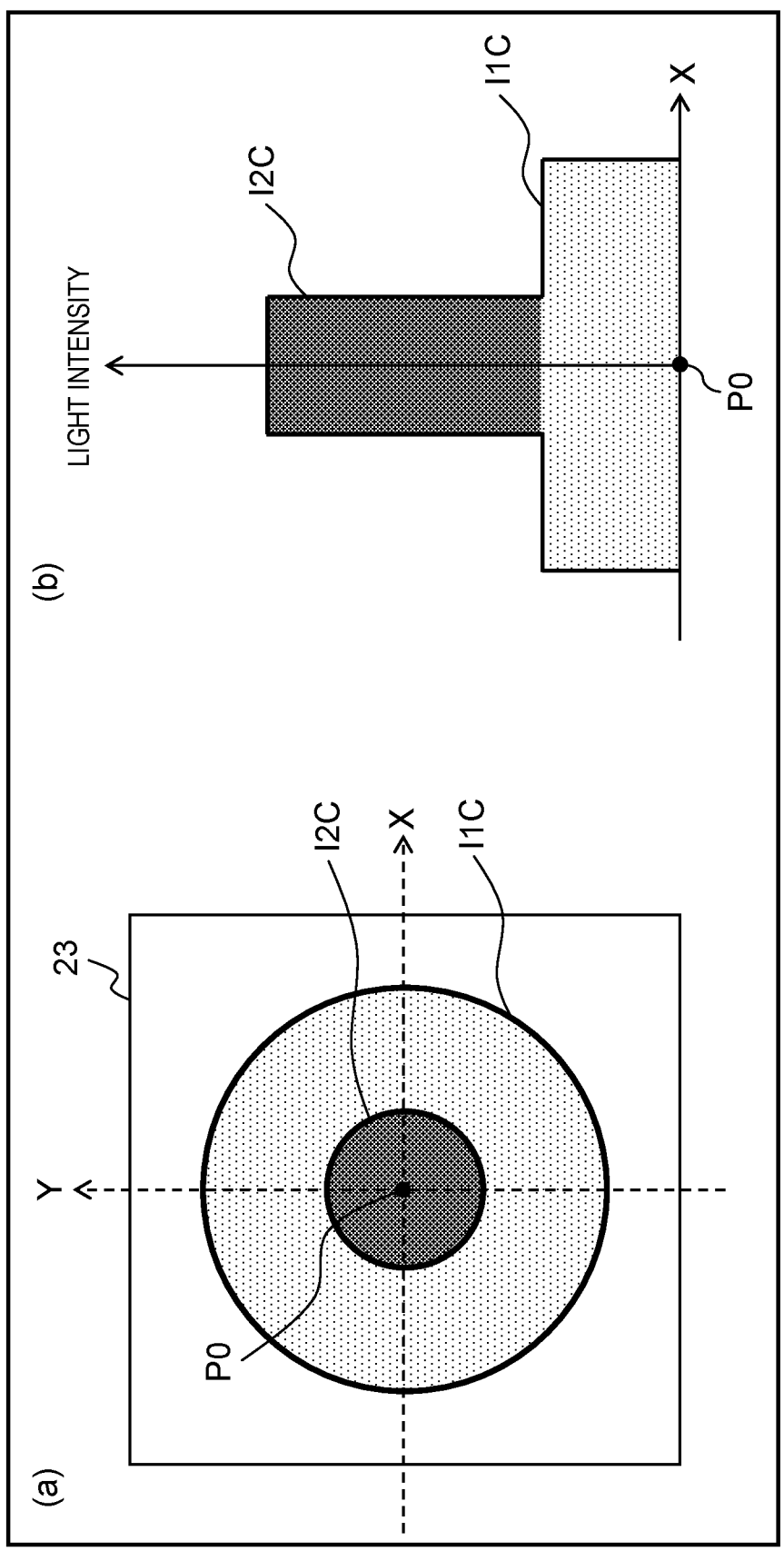
FIG. 15 is a diagram showing an example of a light intensity distribution on a phosphor in the fourth exemplary embodiment.

Part (a) of FIG. 15 shows the light intensity distribution of the excitation light on the principal surface of phosphor 23 in the example of FIG. 14. Part (b) of FIG. 15 shows the light intensity distribution of the excitation light in the X direction of part (a) of FIG. 15.

In the light intensity distribution on phosphor 23 shown in FIG. 15, low component I1C distributed in a large area is based on excitation light L1C from first light source part 31C, and high component I2C localized at a center is based on excitation light L2C from second light source part 32C. As described above, also by converging and diverging excitation light L1C, L2C as far as no condensing point is created on the optical paths from light source parts 31C, 32C to condenser lens 22, the light intensity distribution on phosphor 23 can be controlled, and the output light having a desired illuminance distribution can thus be obtained.

Fifth Exemplary Embodiment

Hereinafter, a fifth exemplary embodiment will be described with reference to FIGS. 16 and 17. In the fifth exemplary embodiment, there will be described an example in which an angle of spreading of a light beam of excitation light is set in two axial directions to control a shape of a light intensity distribution.

Hereinafter, a light source unit according to the present exemplary embodiment will be described, but descriptions of a configuration and operation similar to those of illuminating device 1 and light source unit 2 according to the first exemplary embodiment will be appropriately omitted.

Figure 16:
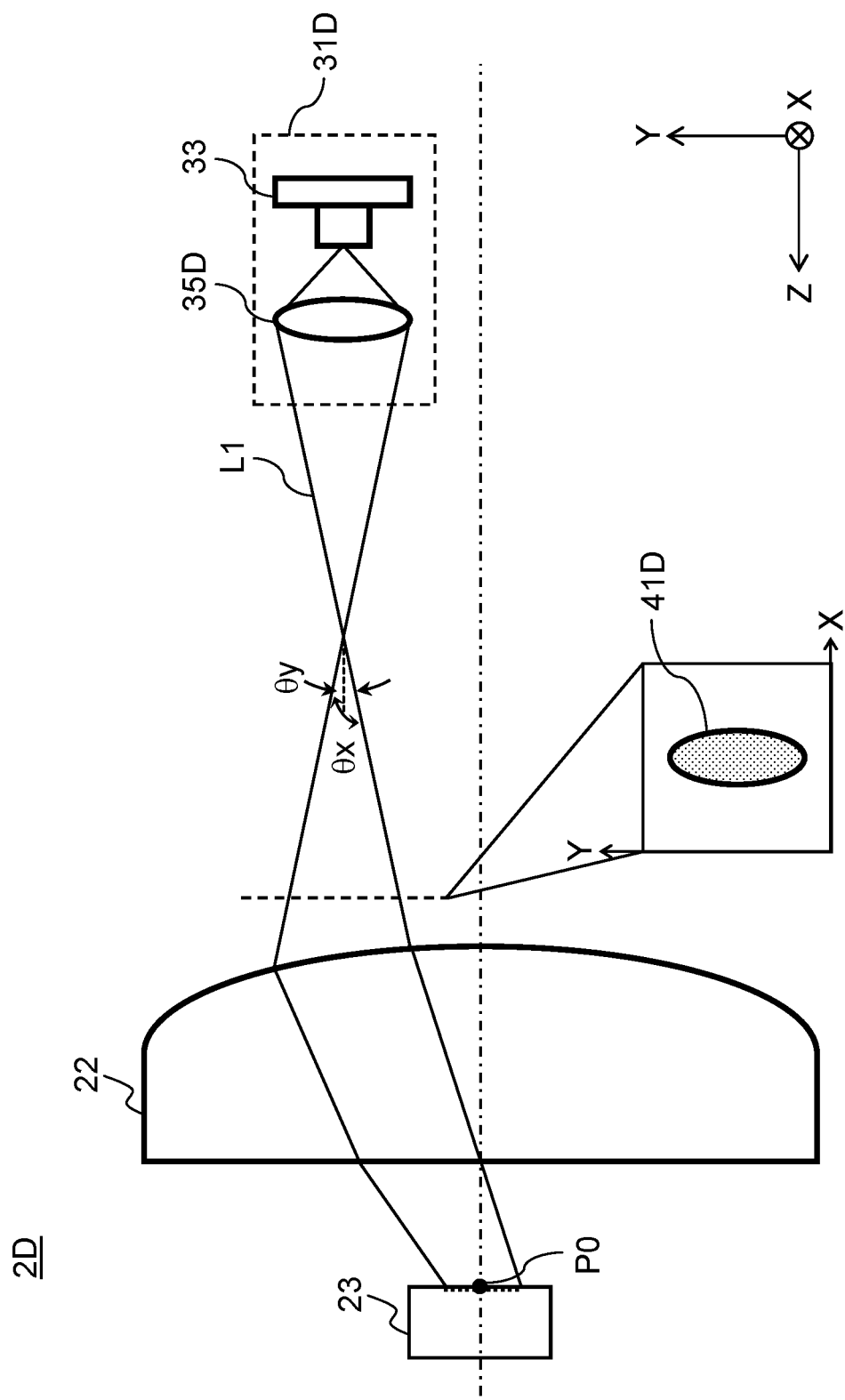
FIG. 16 is a diagram showing a configuration of a light source unit according to a fifth exemplary embodiment.

FIG. 16 is a diagram showing a configuration of light source unit 2D according to the fifth exemplary embodiment. In light source unit 2D according to the present exemplary embodiment, as shown in FIG. 16, in first light source part 31D, divergence angle θx and divergence angle θy respectively representing spreading of a light beam of excitation light L1D in X direction and Y direction are made different from each other. The above setting can be done on, for example, emission lens 35D in first light source part 31D. Further, the setting can be done by using the difference between the divergence angles of the excitation light emitted from light source elements.

In the example of FIG. 16, the setting is done such that divergence angle θx in the X direction of excitation light L1D from first light source part 31D is smaller than divergence angle θy in the Y direction. Therefore, a shape of incidence cross-section 41D of excitation light L1D from first light source part 31D is an elliptic shape whose longitudinal direction is in the Y direction of the X, Y directions. FIG. 17 shows a light intensity distribution of excitation light L1D on phosphor 23 in the present example.

Figure 17:
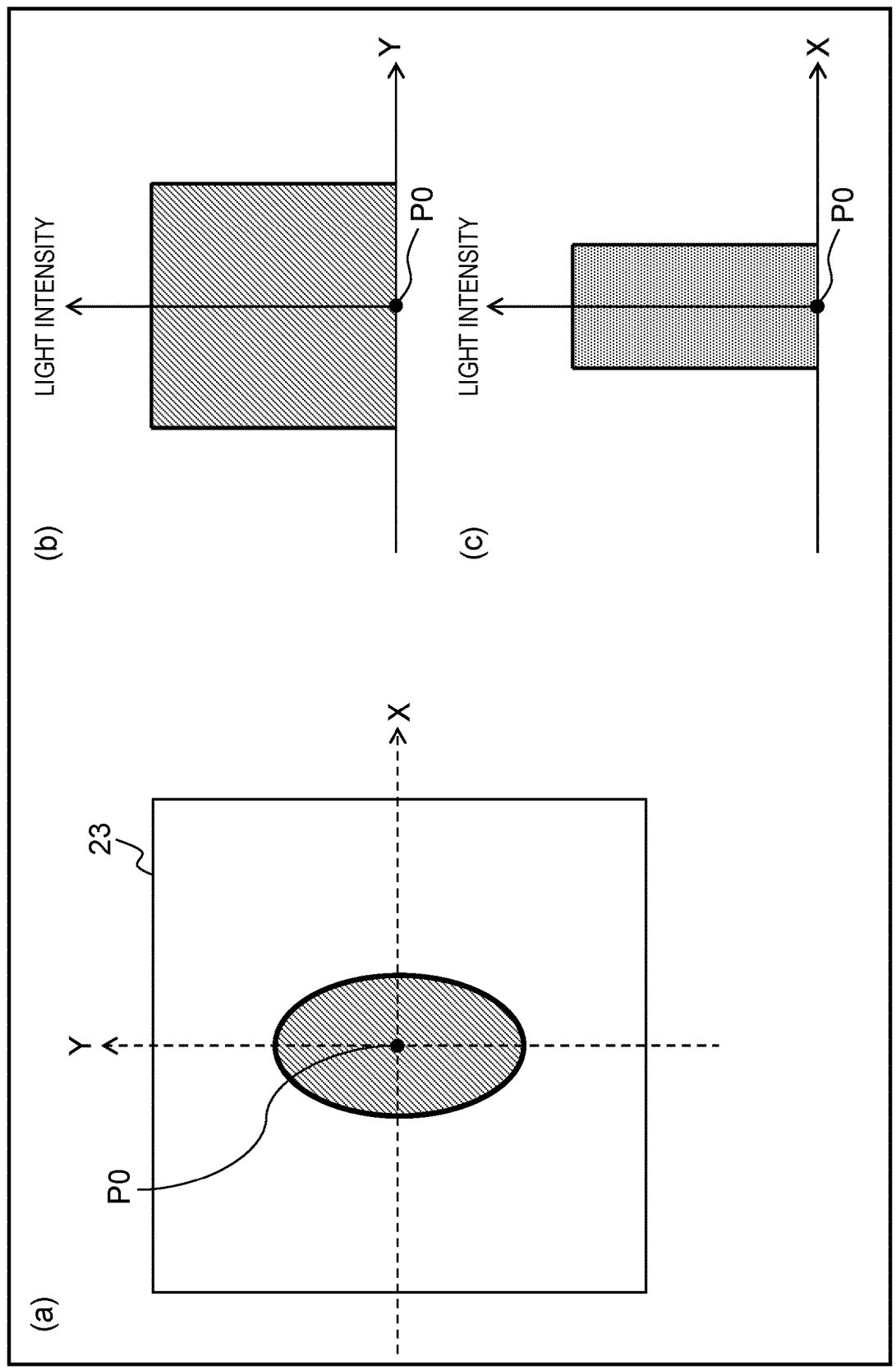
FIG. 17 is a diagram showing an example of a light intensity distribution on a phosphor in the fifth exemplary embodiment.

Part (a) of FIG. 17 shows the light intensity distribution of the excitation light on the principal surface of phosphor 23 in the example of FIG. 16. Part (b) of FIG. 17 shows the light intensity distribution of the excitation light in the Y direction of part (a) of FIG. 17. Part (c) of FIG. 17 shows the light intensity distribution of the excitation light in the X direction of part (a) of FIG. 17.

As shown in FIG. 17, the light intensity distribution of excitation light L1D in the X, Y directions on phosphor 23 of the present example is formed to have the longitudinal direction in the Y direction. As described above, by adjusting divergence angles θx and θy in the X, Y directions or the like, the shape of the light intensity distribution of the excitation light on phosphor 23 can be controlled. With the above configuration, it is possible to obtain the illuminance distribution of the output light of light source unit 2D in various shapes.

Other Exemplary Embodiments

In the above, the first to fifth exemplary embodiments have been described as examples of the techniques disclosed in the present application. However, the techniques in the present disclosure are not limited to the above exemplary embodiments and can also be applied to an exemplary embodiment in which modification, replacement, addition, removal, or the like is performed appropriately. Additionally, the components described in the above exemplary embodiments can be combined to configure a new exemplary embodiment. Therefore, other exemplary embodiments will be illustrated below.

In the above-described first exemplary embodiment, in light source unit 2, mirror 21 (FIG. 2) including openings 21a is used, but the configuration of light source unit 2 is not limited to such mirror 21. A modified example of such a configuration will be described with reference to FIG. 18.

Figure 18:
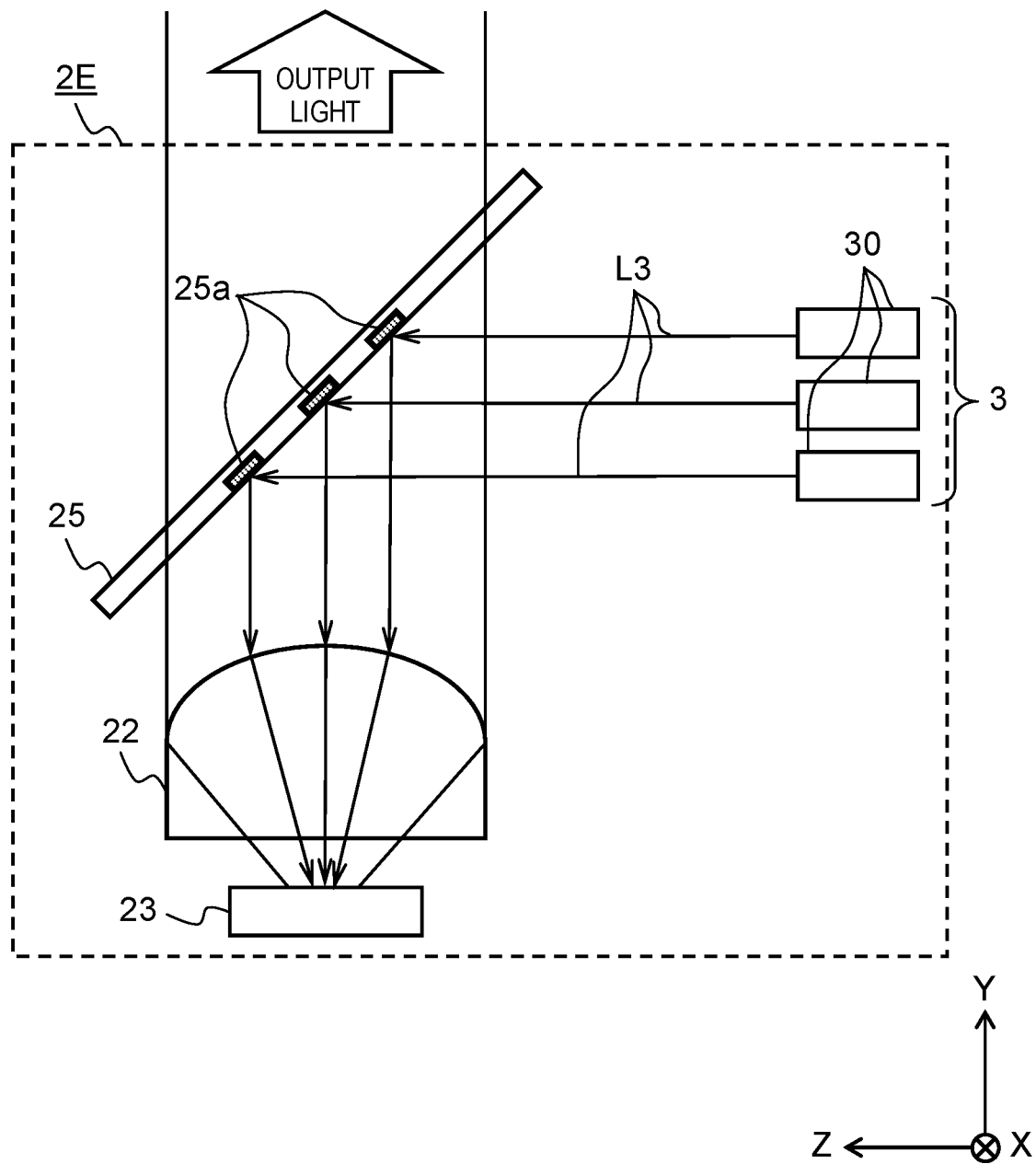
FIG. 18 is a diagram showing a configuration of a light source unit according to a modified example of the first exemplary embodiment.

FIG. 18 is a diagram showing a configuration of light source unit 2E according to a modified example of the first exemplary embodiment. In the first exemplary embodiment, the excitation light from light source 3 passes through the plurality of openings 21a formed in mirror 21, and the emitted light from phosphor 23 is reflected by mirror 21 (see FIG. 2). Light source unit 2E of the present modified example, in a configuration similar to that of the first exemplary embodiment, includes optical member 25 instead of mirror 21. Optical member 25 has a plurality of reflection regions 25a (reflection parts) for reflecting excitation light L3 from light source 3, as shown in FIG. 18.

In light source unit 2E of the present modified example, optical member 25 is configured, for example, such that a plurality of dot-shaped light reflection films corresponding to reflection regions 25a are provided on a transparent substrate. Optical member 25 is disposed similarly to mirror 21 of the first exemplary embodiment. Further, the plurality of reflection regions 25a are located at the positions at which optical axes of light source units 30 included in light source 3 pass, in a similar manner to openings 21a in the first exemplary embodiment. The excitation light of each of light source units 30 enters corresponding reflection region 25a and is reflected while being further converged. An area of optical member 25 other than reflection regions 25a allows light such as fluorescent light to pass through. Further, in a similar manner to the positions of openings 21a in mirror 21, positions of reflection regions 25a on optical member 25 are located not near a center but near an outer periphery of optical member 25.

In light source unit 2E of the present modified example, as shown in FIG. 18, phosphor 23 is disposed on the negative Y side of optical member 25 such that a principal surface of phosphor 23 is parallel to the XZ plane and is directed to the positive Y side. Further, condenser lens 22 is disposed between optical member 25 and phosphor 23 such that an optical axis of condenser lens 22 is directed in the Y direction.

In light source unit 2E of the present modified example, the beams of excitation light L3 from light source 3 having the plurality of light source units 30 are each reflected by corresponding reflection region 25a on optical member 25 and are irradiated on phosphor 23 through condenser lens 22. Further, in response to excitation light L3 entering in the negative Y direction, phosphor 23 emits fluorescent light and the like as if the phosphor 23 reflects the excitation light L3 in the positive Y direction. The light emitted from phosphor 23 travels in the positive Y direction through condenser lens 22, passes through optical member 25, and is then emitted as output light of light source unit 2E. Also in light source unit 2E described above, in a similar manner to the above-described first to fifth exemplary embodiments, it is possible to control the light intensity distribution on phosphor 23 to obtain output light having a desired illuminance distribution.

Further, in each of the above-described exemplary embodiments, each of light source units 2 to 2E uses phosphor 23 that emits fluorescent light and the like as if phosphor 23 reflects the incident excitation light. A phosphor of a light source unit according to the present disclosure is not limited to such a phosphor, and, for example, it is possible to use a phosphor that emits fluorescent light and the like as if the fluorescent light passes through in response to entering of the excitation light. In this case, it is possible to appropriately omit configurations such as mirror 21 and optical member 25 for making the excitation light enter the phosphor. Further, for example, an optical system or the like similar to condenser lens 22 may be provided on a passing side of the phosphor to emit the output light outside.

Further, in each of the above-described exemplary embodiments, the light source unit includes the first and second light source parts, but a light source unit of the present disclosure may, of course, further include one or a plurality of light source parts. The further light source part or further light source parts include a light source element and an emission lens, in a manner similar to that in the first and second light source parts, and irradiate excitation light on phosphor 23 such that the excitation light forms a light intensity distributions different from the light intensity distribution of the first and second light source part.

Further, in each of the above-mentioned exemplary embodiments, an example has been described in which the light source unit outputs white light by converting part of the excitation light of blue light into fluorescent light of yellow light, but the light source unit according to the present disclosure is not limited to such an example. For example, the light source unit may convert the excitation light of blue light into yellow light and output the yellow light as the output light. Further, in the present disclosure, the excitation light does not have to be blue light and may be light in various wavelength ranges. Further, the fluorescent light does not have to be to yellow light, and the fluorescent light may be light in various wavelength ranges. As described above, the light source unit according to the present disclosure may output various types of light on the basis of various types of excitation light.

Further, in each of the above-described exemplary embodiments, as an application example of each of light source units 2 to 2E and illuminating device 1, a description has been made based on in-vehicle use, but the application of the light source unit and the illuminating device according to the present disclosure is not limited to in-vehicle use. A light source unit and an illuminating device according to the present disclosure can be applied to various techniques such as spotlights for stage performance, indoor illumination, outdoor illumination, and projection mapping.

The exemplary embodiments have been described above as examples of the techniques according to the present disclosure. For this purpose, the accompanying drawings and the detailed description are provided.

Therefore, in order to illustrate the above techniques, the components described in the accompanying drawings and the detailed description can include not only the components necessary to solve the problem but also components unnecessary to solve the problem. For this reason, it should not be immediately recognized that those unnecessary components are necessary just because those unnecessary components are described in the accompanying drawings and the detailed description.

In addition, because the above exemplary embodiments are for illustrating the techniques in the present disclosure as examples, various modifications, replacements, additions, removals, or the like can be made without departing from the scope of the claims or the equivalent thereof.

INDUSTRIAL APPLICABILITY

The present disclosure can be applied to headlights, spotlights, indoor illumination, outdoor illumination, projection mapping, and the like.

REFERENCE MARKS IN THE DRAWINGS

1: illuminating device
12: DMD
2, 2A, 2B, 2C, 2D, 2E: light source unit
21: mirror
21a: opening
22: condenser lens
23: phosphor
25: optical member
25a: reflection region
3: light source
30: light source part
31, 31A, 31B, 31C, 31D: first light source part
32, 32A, 32C: second light source part
33, 34, 38: light source element
35, 35A, 35B, 35C, 35D, 36, 36A, 36C, 39: emission lens

The invention claimed is:

1. A light source unit, comprising:
   a phosphor that emits fluorescent light, based on first excitation light and second excitation light;
   a condenser lens that condenses the first excitation light and the second excitation light on the phosphor,
   a first light source part that emits the first excitation light in such a manner that the first excitation light forms a first light intensity distribution on the phosphor;
   a second light source part that emits the second excitation light in such a manner that the second excitation light forms a second light intensity distribution different from the first light intensity distribution on the phosphor; and
   a mirror that is disposed between the condenser lens and each of the first light source part and the second light source part, and reflects light from the condenser lens,
   wherein the mirror includes:
      a first opening that the optical axis of the first light source part passes through, and
      a second opening that the optical axis of the second light source part passes through,
   the first light source part includes a first emission lens that condenses the first excitation light such that the first excitation light has a focal point between the first emission lens and the condenser lens, and
   the second light source includes a second emission lens that condenses the second excitation light such that the second excitation light has a focal point between the second emission lens and the condenser lens.

2. The light source unit according to claim 1, wherein an incident state where the first excitation light emitted from the first light source part enters the condenser lens and an incident state where the second excitation light emitted from the second light source part enters the condenser lens are different from each other.

3. The light source unit according to claim 1, further comprising a switching unit that switches light intensity distributions on the phosphor, by combining emission and non-emission of the first excitation light of the first light source part and the second excitation light of the second light source part.

4. The light source unit according to claim 1, wherein
   the first emission lens sets an angle of spreading of a light beam of the first excitation light to a first angle, and
   the second emission lens sets an angle of spreading of a light beam of the second excitation light to a second angle different from the first angle.

5. The light source unit according to claim 1, wherein an optical path length from the first light source part to the condenser lens and an optical path length from the second light source part to the condenser lens are different from each other.

6. The light source unit according to claim 1, wherein a direction of an optical axis of the first light source part and a direction of an optical axis of the second light source part are different from each other.

7. The light source unit according to claim 1, wherein the first opening and the second opening are disposed not near a center of the mirror but near an outer periphery of the mirror.

8. The light source unit according to claim 1, wherein each of the first light source part and the second light source part includes a laser light source.

9. An illuminating device comprising:
   the light source unit according to claim 1; and
   a spatial light modulation element that spatially modulates light from the light source unit.

10. The light source unit according to claim 1, wherein
    the first emission lens condenses the first excitation light such that the focal point of the first excitation light is in a vicinity of the first opening of the mirror, and
    the second emission lens condenses the second excitation light such that the focal point of the second excitation light is in a vicinity of the second opening of the mirror.

11. The light source unit according to claim 1, wherein
    the first emission lens condenses the first excitation light such that the focal point of the first excitation light is inside the first opening of the mirror, and
    the second emission lens condenses the second excitation light such that the focal point of the second excitation light is inside the second opening of the mirror.

12. A light source unit, comprising:
    a phosphor that emits fluorescent light, based on first excitation light and second excitation light;
    a condenser lens that condenses the first excitation light and the second excitation light on the phosphor,
    a first light source part that emits the first excitation light in such a manner that the first excitation light forms a first light intensity distribution on the phosphor;
    a second light source part that emits the second excitation light in such a manner that the second excitation light forms a second light intensity distribution different from the first light intensity distribution on the phosphor; and
    an optical member that is disposed between the condenser lens and each of the first light source part and the second light source part and reflects the first excitation light from the first light source part and the second excitation light from the second light source part, wherein light from the condenser lens passes through the optical member,
    the optical member has:
       a first reflection part that reflects the first excitation light, and
       a second reflection part that reflects the second excitation light,
    the first light source part includes a first emission lens that condenses the first excitation light such that the first excitation light has a focal point between the first emission lens and the condenser lens, and
    the second light source part includes a second emission lens that condenses the second excitation light such that the second excitation light has a focal point between the second emission lens and the condenser lens.

13. The light source unit according to claim 12, wherein the first reflection part and the second reflection part are located not near a center of the optical member but near an outer periphery of the optical member.

14. The light source unit according to claim 12, wherein
    the first emission lens condenses the first excitation light such that the focal point of the first excitation light is in a vicinity of the first reflection part of the optical member, and
    the second emission lens condenses the second excitation light such that the focal point of the second excitation light is in a vicinity of the second reflection part of the optical member.

15. The light source unit according to claim 12, wherein the first emission lens condenses the first excitation light such that the focal point of the first excitation light is on the first reflection part of the optical member, and the second emission lens condenses the second excitation light such that the focal point of the second excitation light is on the second reflection part of the optical member.

16. An illuminating device comprising:
the light source unit according to claim 12; and
a spatial light modulation element that spatially modulates light from the light source unit.

* * * * *